United States Patent [19]
Hebener

[11] Patent Number: 5,971,380
[45] Date of Patent: Oct. 26, 1999

[54] FLUID-ACTUATED WORKHOLDING APPARATUS

[76] Inventor: Helmut Hebener, AM Dusselufer 46, Erkrath, Germany, 40699

[21] Appl. No.: 09/005,896

[22] Filed: Jan. 15, 1998

Related U.S. Application Data

[62] Division of application No. 08/602,372, Feb. 16, 1996.

[30] Foreign Application Priority Data

Feb. 18, 1995 [DE] Germany ..................... 295 02 702 U
Aug. 30, 1995 [DE] Germany ..................... 295 13 907 U

[51] Int. Cl.$^6$ .................................................. B23Q 3/00
[52] U.S. Cl. ................................. 269/20; 269/32; 269/24; 269/30
[58] Field of Search ............................. 269/32, 25, 30, 269/31, 20, 27, 74, 98, 24; 279/4.01, 4.07–4.09

[56] References Cited

U.S. PATENT DOCUMENTS

| | | | |
|---|---|---|---|
| 3,835,649 | 9/1974 | Le Testu ............................... | 279/4.01 |
| 4,043,547 | 8/1977 | Glomb et al. . | |
| 4,319,516 | 3/1982 | Rohm .................................... | 279/4.01 |
| 4,504,046 | 3/1985 | Yonezawa et al. . | |
| 4,571,131 | 2/1986 | Date . | |
| 4,669,161 | 6/1987 | Sekelsky, Jr. . | |
| 4,773,636 | 9/1988 | Takahashi . | |
| 4,799,657 | 1/1989 | Miller ..................................... | 269/24 |
| 4,850,099 | 7/1989 | Scollard . | |
| 4,934,674 | 6/1990 | Bernstein . | |
| 4,946,178 | 8/1990 | Korson et al. ......................... | 279/4.09 |
| 4,986,704 | 1/1991 | Narushima et al. . | |
| 5,022,636 | 6/1991 | Swann . | |
| 5,098,073 | 3/1992 | Lenz . | |
| 5,108,079 | 4/1992 | Yonezawa et al. ................... | 269/24 |
| 5,160,124 | 11/1992 | Yamada et al. . | |
| 5,161,788 | 11/1992 | Guzzoni ................................. | 269/20 |
| 5,242,159 | 9/1993 | Bernstein . | |
| 5,306,136 | 4/1994 | Oomori et al. . | |
| 5,374,040 | 12/1994 | Lin . | |
| 5,441,284 | 8/1995 | Mueller et al. ....................... | 279/4.07 |
| 5,458,321 | 10/1995 | Durfee, Jr. . | |
| 5,549,427 | 8/1996 | Hiestand ............................... | 279/4.01 |

FOREIGN PATENT DOCUMENTS

| | | |
|---|---|---|
| 0440585 | 8/1991 | European Pat. Off. . |
| 2578180 | 9/1986 | France . |
| 4339439 | 3/1995 | Germany . |
| 2123722 | 2/1984 | United Kingdom . |

*Primary Examiner*—David A. Scherbel
*Assistant Examiner*—Lee Wilson
*Attorney, Agent, or Firm*—Kirkpatrick & Lockhart LLP

[57] ABSTRACT

A fluid-actuated workholding apparatus that includes a base member that has a longitudinally extending slot and a fixed jaw attached thereto. The apparatus further includes first and second movable jaw members that are operably supported on the base member for movement towards and away from the fixed jaw member along the longitudinally extending slot. A clamping assembly is operably supported within the longitudinally extending slot and serves to define a fluid receiving cavity for receiving a pressurized fluid therein. The clamping assembly communicates with the first and second movable jaw members such that when a predetermined amount of pressurized fluid is admitted to the receiving cavity, the first and second movable jaw members are caused to move away from the fixed jaw member. The clamping assembly also includes means for biasing the first and second movable jaw members towards the fixed jaw member when the pressurized fluid is removed from the receiving cavity to enable a first workpiece to be clamped between the first movable jaw member and the fixed jaw member under a compressive force and a second workpiece to be clamped between the second movable jaw member and the fixed jaw member under the same compressive force.

10 Claims, 29 Drawing Sheets

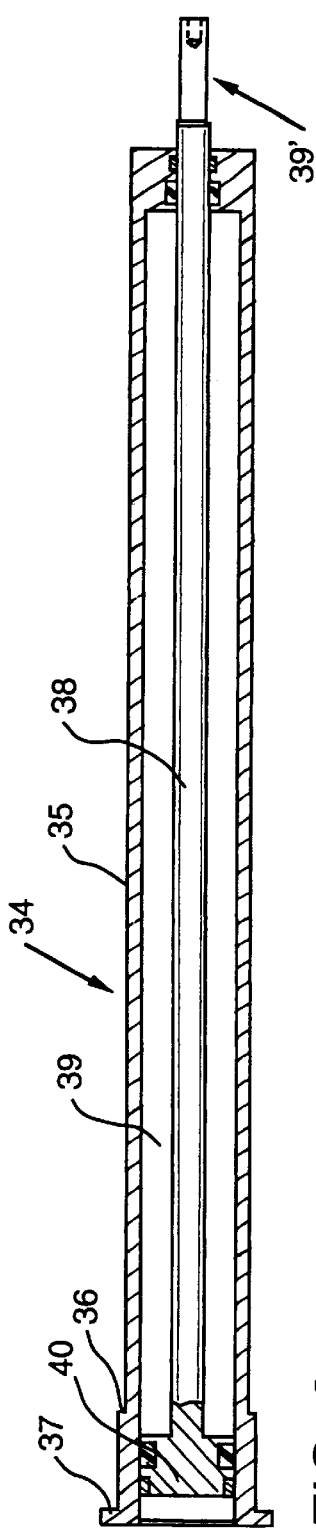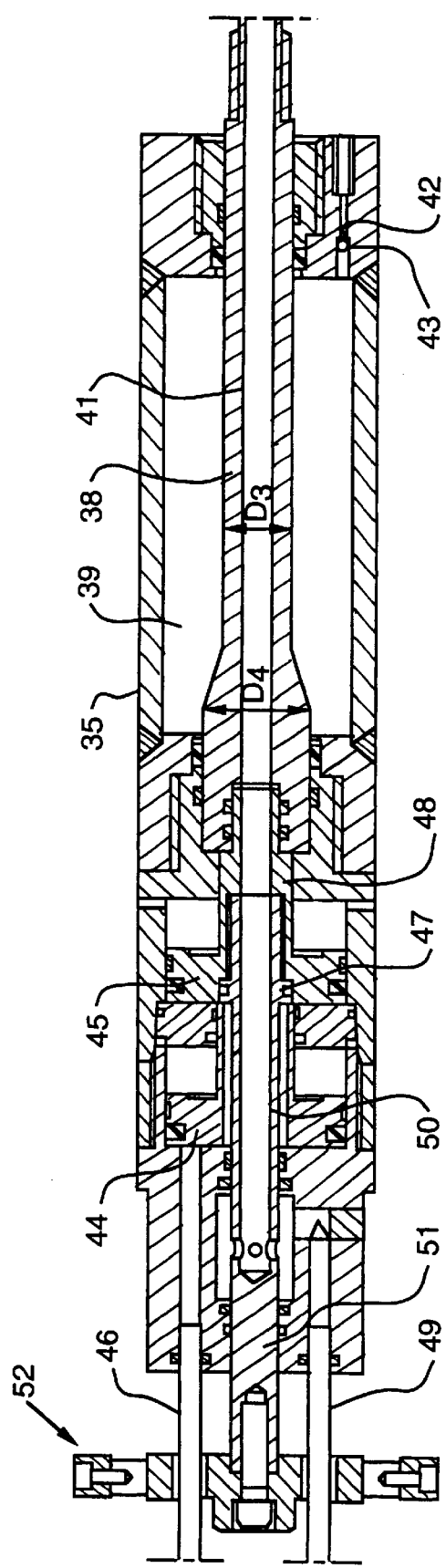
FIG. 3
FIG. 4

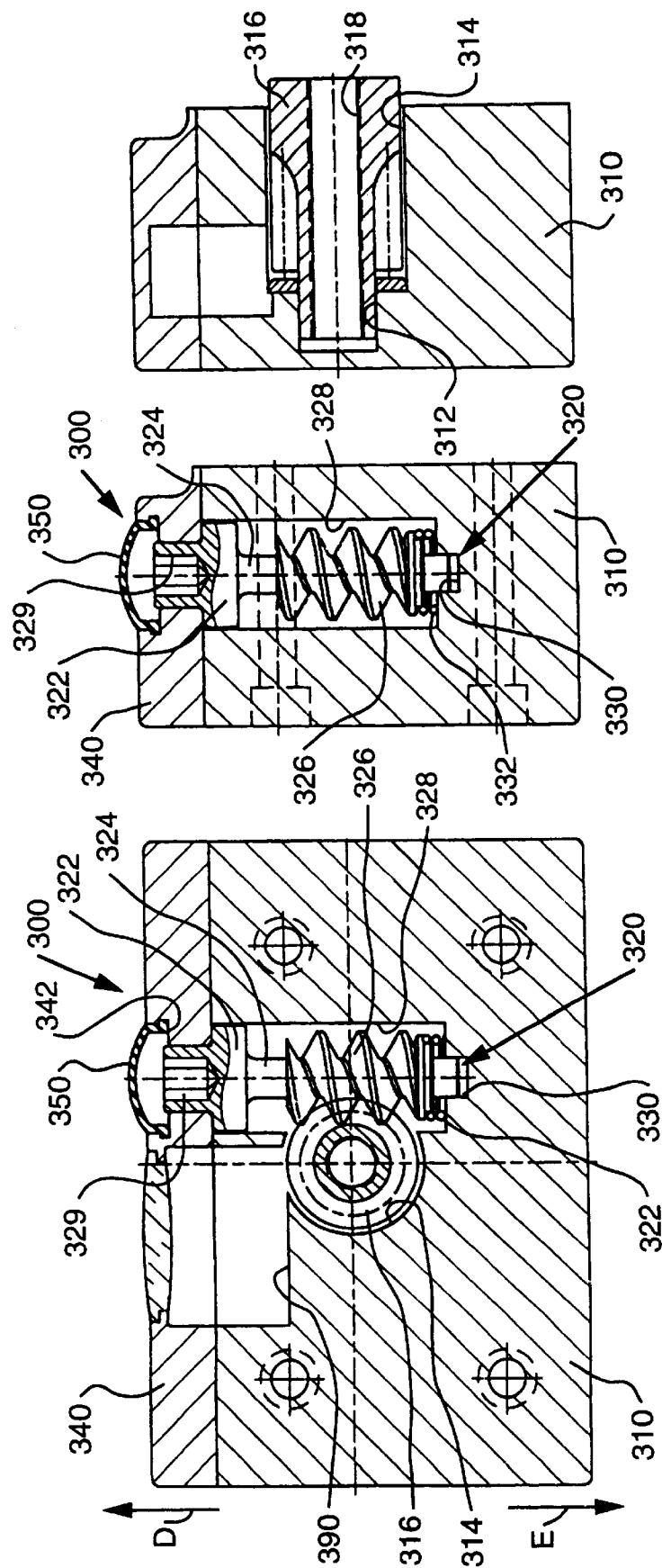

FLUID-ACTUATED WORKHOLDING APPARATUS

This patent application is a divisional application of U.S. patent application Ser. No. 08/602,372, filed Feb. 16, 1996, which claims priority from Federal Republic of Germany Application No. 295 02 702.9, filed Feb. 18, 1995 and Federal republic of Germany Application No. 295 13 907.2, filed Aug. 30, 1995.

BACKGROUND OF THE INVENTION

1. Field of the Invention

The invention concerns an actuation device for clamping of workpieces, in particular, to a machine tool, for example, as by actuation of a chuck, there being an axially movable actuation member provided to actuate the chuck, and in which, moreover, the actuation device has an externally closed receiving space, which is filled with a volume-compressible pressurized medium, preferably silicone oil, and a movement of the actuation member is associated with a change in volume of the receiving space. Such an actuation device is known, for example, from the not previously published German Patent Application P 43 39 439. The content of this patent application is herewith included fully, including for purposes of incorporating features of this older application into claims of the present patent application.

2. Description of the Invention Background

Workholding apparatuses are used to support an object to be machined (a "workpiece") or a number of workpieces in precise orientations relative to a machine tool such as, for example, a milling machine. Such apparatuses may comprise vises that are attached to a table known as a "grid plate" that is attached or supported relative to the milling machine.

Single station vises and dual station vises are known in the art. Both of those types of workholders can be manually actuated or actuated by, for example, electric, hydraulic or pneumatic means. Manually operated vise-like workholders typically employ a fixed jaw and screw that has one or more movable clamping jaws operably attached thereto for movement relative to the fixed jaw. As the screw is rotated, the movable jaw(s) serve to clamp the workpiece(s) between the movable jaw(s) and the fixed jaw.

While such manually operated vises are well suited for supporting various types and numbers of workpieces, they are generally difficult to automate because a rotary force must be applied to the vise screw in a precise manner to ensure that proper clamping forces are repeatedly generated. Also, the magnitude of such clamping forces are dependent upon the operator either utilizing a torque wrench or similar tool to apply the requisite amount of torque or the vise is simply adjusted by "feel".

In an effort to address such problems associated with manually operated vises, hydraulically actuated vises have been developed. Such vises may also be of a single or dual station design and are generally operated by the application of hydraulic fluid under pressure to the vise. The clamping forces generated by such vises can be adjusted by varying the pressure of the hydraulic fluid which causes the jaws to clamp the workpiece(s). However, when power is accidentally lost to the hydraulic systems supplying the pressurized fluid to the vise, the jaws may be free to open which can result in the unintentional release of the workpiece(s) from the vise. Therefore, there is a need for a hydraulically actuated workholding vise that will remain in a clamped position when power is lost or discontinued.

SUMMARY OF THE INVENTION

The present application is concerned with configuring the principle described in the older German patent application with a structural improvement in the sense of a simplification, as well as an enhanced reliability.

This configuration is essentially achieved in that the actuation member, which can move relative to the receiving space, passes through the receiving space, and one segment of the passageway of the actuation member is fashioned as a stepped piston. Because the actuating device passes directly through the receiving space, the compressed medium enclosed in the receiving space can act directly on the actuating device. The configuration in the form of a step piston means that a relative movement between the actuating device and the receiving space is necessarily associated with a change in volume of the receiving space. When the clamping device is opened (in respect of a use of the actuation device in a machine tool), the volume of the medium in the receiving space is compressed. In another configuration, the actuation member can also be hydraulically activated. The hydraulic actuation is provided for the opening, and also in respect of the application in the actuation of a clamping device in a machine tool. It is not necessary to apply any hydraulic pressure during the machining of the clamped work. The losses otherwise associated with a hydraulic actuation do not occur. The opening may also occur with the spindle rotating, although there are losses (energy) in this case, but confined to this period of time (the opening). On the other hand, the hydraulic actuation for the opening of the actuating device, i.e., for moving the segment of the actuation member passing through the receiving space in the sense of a reduction of the volume of the receiving space, enables an easy opening of the actuation mechanism. In an additional detail, it is proposed that the actuation member be fashioned directly with a flange, which is part of a hydraulic piston/cylinder arrangement. Thus, the actuation member has a straight-passage segment and a piston segment, which is formed as the piston of the aforesaid hydraulic piston/cylinder arrangement. Furthermore, there is a connection for introduction of hydraulic oil or transmission of requisite hydraulic pressure, which in sealed manner by a stationary ring transmits the hydraulic pressure to the rotating part of the actuation device during the operation of the machine—described in respect to the machine tool application example.

Another object of the invention is a preassembled cartridge for power actuation, e.g., opening and tightening a device, with a receiving body and a ram passing through the receiving body and able to move relative to the receiving body, the ram being spring-loaded at one end position. In order to specify a unit that is interchangeable and that can be used separately for a machine unit in which an actuation is supposed to be carried out, the invention proposes in this connection that the pretensioning be accomplished by a fluid enclosed in the receiving space that can be elastically compressed back to its original volume, and that the ram have an element for connection to a machine part. According to the invention, a separate and, thus, also interchangeable preassembled cartridge is specified, which is essential to the desired actuation. The connection point of the ram can be configured in many different ways. For example, the ram can have a screw threading at one end, fastening to another machine element, and the ram can also have a claw coupling or be suitably fashioned for grasping by a claw coupling. The fluid is preferably a silicone oil, as is also described individually in the German patent application P 43 39 439, already mentioned above as the state of the art. In a further configuration, the ram is preferably formed as a differential piston. In this configuration, the ram has segments of different diameter in the receiving space, so that the volume of the compressible fluid enclosed in the receiving space is compressed when a movement occurs. But the ram can also be fashioned with a piston bottom at one end, so that a compression of the volume of the fluid enclosed in the receiving space likewise occurs by movement of the ram and the piston bottom in the receiving space, acting as a cylinder. Furthermore, the ram can be preferably linked to a hydraulic piston-cylinder space. In this way, by hydraulic actuation the ram can be moved against the increasing force of the compression of the volume of fluid contained in the receiving space. Restoration occurs automatically, due to the elastic recoil of the enclosed fluid. A preferred embodiment also proposes that the ram be hollow. This may be recommended when conducting a fluid through a solid. In the case of a machine tool, this may be a flushing agent or also a lubricating agent. The receiving space can further be suitably configured with a fill opening, in which a check valve is arranged. Generally, it is now necessary to fill the receiving space only once with the particular fluid. The device is then maintenance-free for its entire lifetime.

Another object of the invention is a viselike work-clamping device with a fixed jaw and a movable tightening jaw, the tightening jaw being pretensioned against the fixed jaw, and also having an actuating member firmly connected to the tightening jaw, said actuating member forming part of the wall of a receiving space. Such viselike work-clamping devices are familiar in diverse configurations. They are used to secure a workpiece so that it can then be machined suitably by boring, filing, milling, or the like. In order to create a simple, reliable, and effective tightening capability here, the invention proposes that the receiving space be filled with an elastically volume-compressible fluid, particularly silicone oil, and that a compression or decompression of the fluid be connected to a movement of the actuating member. In a further configuration, the work-clamping device has two movable jaws. Here, the movable jaws are pretensioned against a fixed part, which likewise forms part of the wall of the receiving space. The actuating member and the fixed part can move relative to each other in order to change the volume of the receiving space. Preferably, both the fixed part and the movable part can move relative to the fixed jaws. In another preferred configuration, an end piece of the movable part is fashioned as a piston, which is hydraulically operated to move the movable part relative to the fixed part. Moreover, it can be preferably provided that another end piece of the movable part is fastened by screwing to an adjusting nut, mounted in the first movable jaw.

BRIEF DESCRIPTION OF THE DRAWINGS

The invention shall be further explained below by means of the enclosed drawings, which only represent sample preferred embodiments.

FIG. 3 shows a cross section of a preassembled cartridge of first type;

FIG. 4 shows a cross section of a preassembled cartridge of a second type;

FIG. 27 shows a cross-sectional end elevational view of a housing member of the embodiment of FIG. 26;

FIG. 28 shows a partial cross-sectional side elevational view of the housing assembly of FIG. 27;

FIG. 29 shows another partial cross-sectional side elevational view of the housing assembly of FIGS. 27–28;

DETAILED DESCRIPTION OF THE PREFERRED EMBODIMENTS

Figure 1:
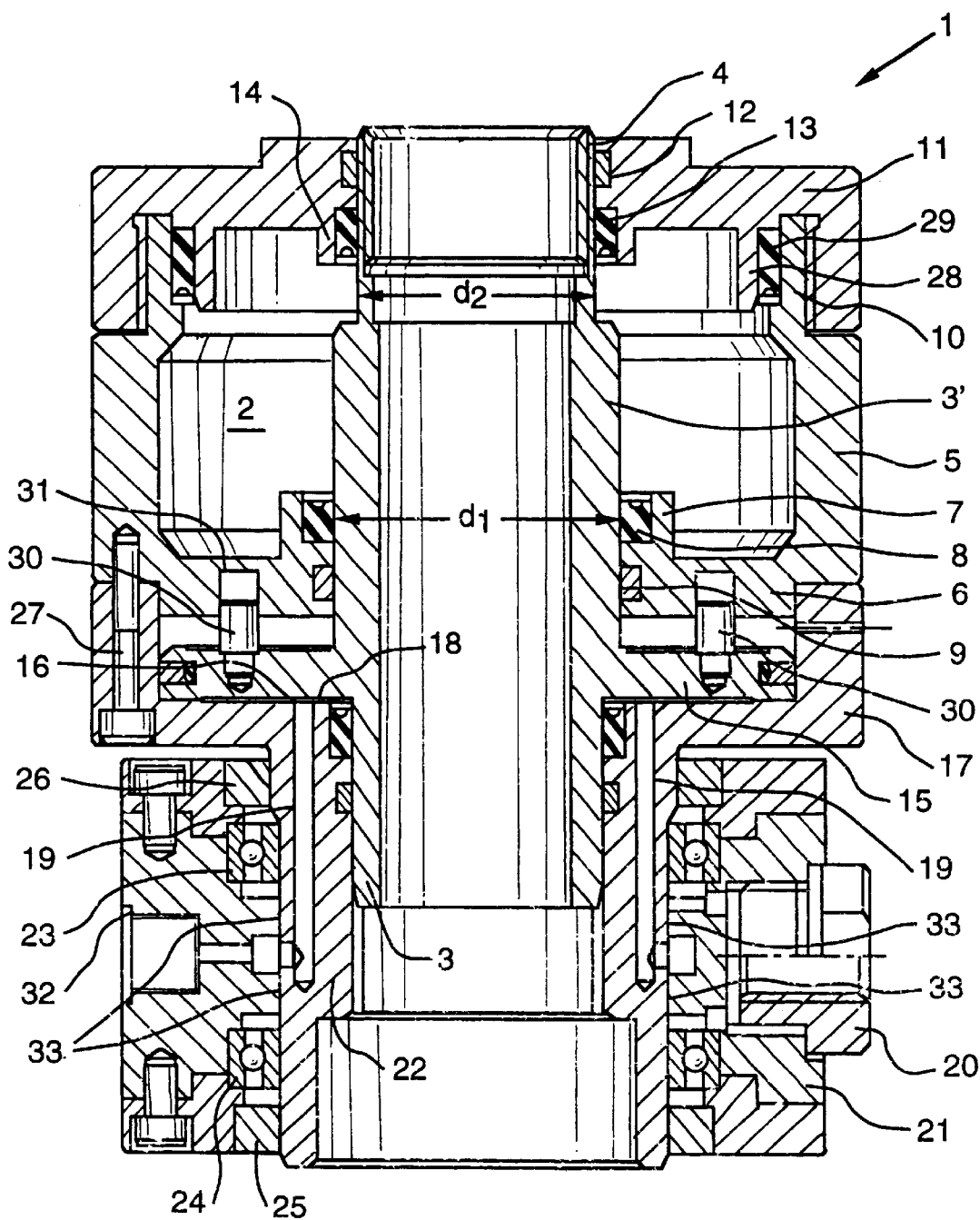
FIG. 1 shows a cross section through an actuation mechanism, in relaxed position of the actuation member or largest volume of the receiving space.
Figure 2:
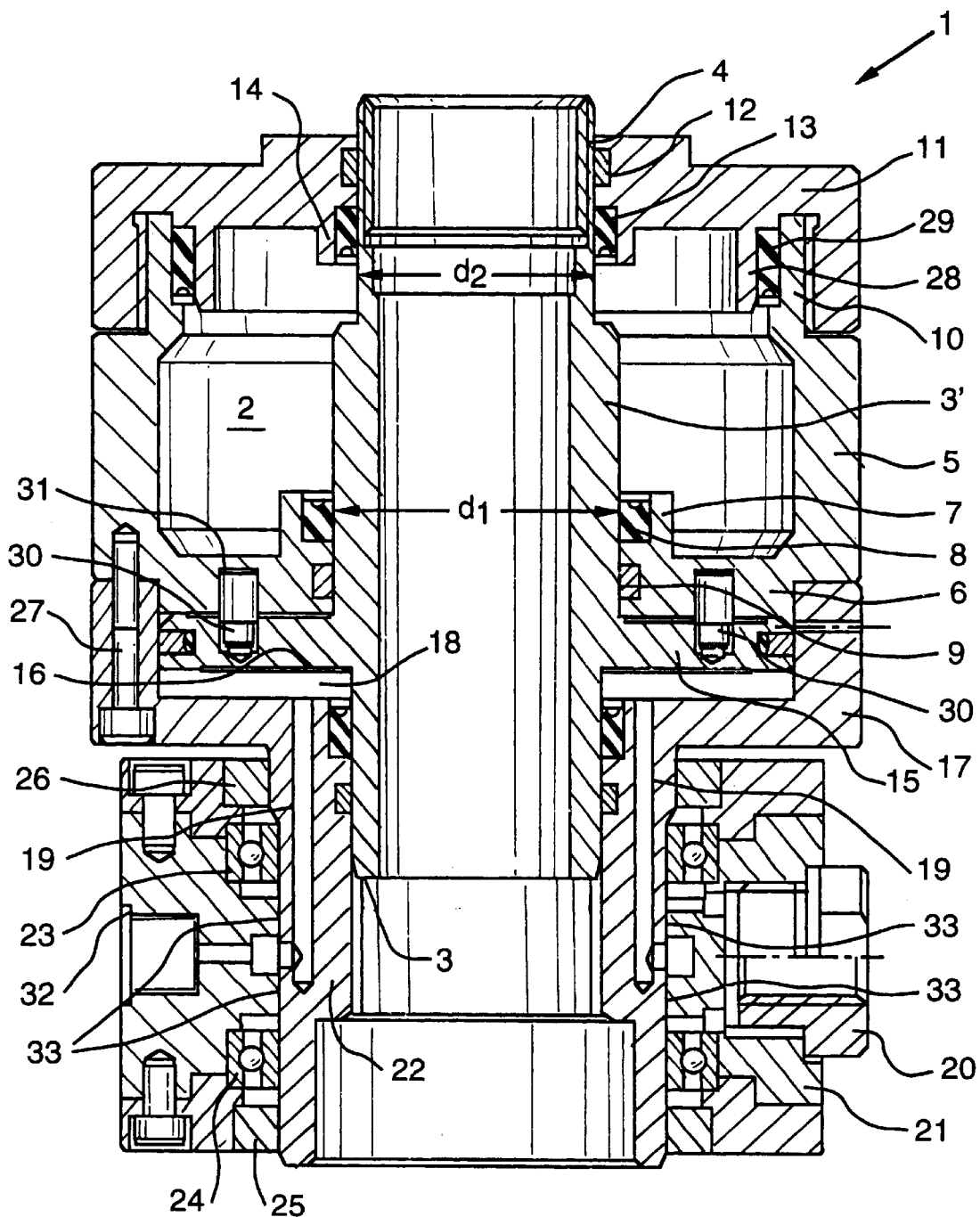
FIG. 2 shows a cross section of FIG. 1, in the tightened position of the actuation member or smallest volume of the receiving space.

An actuation device 1 with an actuation member 3 is represented and described, initially with respect to FIGS. 1 and 2. This actuation member can be connected to the chuck (not shown) of a machine tool—via a thread 4 in the sample embodiment. The actuation device 1 can also be called a positioning mechanism.

It is important that the actuation device 1 have a receiving space 2 for a compressible medium, such as silicone oil, in particular. A through segment 3' of the actuation member 3 passes through the receiving space 2.

The through segment 3' has a larger diameter d1 on one portion of its length and a smaller diameter d2 on a second portion of its length. This produces an effective step piston in the receiving space 2.

As the actuation member 3 moves from the position of FIG. 1 to the position of FIG. 2, the effective length of the through segment 3' with diameter d1 increases in the receiving space 2 and the effective length of the through segment 3' with diameter d2 in the receiving space 2 decreases. This, at the same time, reduces the volume of the receiving space 2, so that a compressible medium such as the aforesaid silicone oil, located therein, is compressed. Furthermore, this increases the pressure in the receiving chamber 2, so that in the position of FIG. 2, which characterizes the open condition of the machine tool in the application concerning a clamping mechanism of a machine tool, an increased admission pressure is produced in respect of a closing of the clamping device. Moreover, the coordination between the through segment 3' and the filling of the receiving space 2 with the compressible medium is such that a pretension for closing remains even in the position of FIG. 1. The essential point is that a highly reliable mechanism is achieved, owing to the closed receiving space 2. No loss of admission pressure can occur.

The actuation member 3 and the through segment 3' pass centrally through the receiving space 2.

Moreover, the receiving chamber 2 is formed by a cuplike wall 5, which forms an integral bottom 6 of the receiving space. The receiving space bottom 6 also has, on the inside, a sealing flange 7 matched up with the through segment 3'. In the sealing flange 7, as in the receiving space floor 6 itself, a seal 8 is arranged radially internal and sealing off the through segment 3'. Moreover, a guide ring 9 is arranged underneath the seal 8 in the sample embodiment. The cuplike wall 5 at the upper end passes into a fastening edge 10 that is reduced radially inwards. The fastening edge 10 is provided with an outer threading to secure a cover 11. The cover 11, like the receiving space floor 6, has a radial seal 13 and, in the sample embodiment, a guide ring 12 above the radial seal 13. The radial seal 13 is likewise positioned in a sealing flange 14. The seal 13 and the guide ring 12 respectively seal and guide the cover 13 relative to the actuation member 3.

Furthermore, a peripheral flange 28 is fashioned in the cover 11, protruding downward from one inner surface of the cover. Another seal 29 is accommodated between the flange 28 of the cover 11 and the fastening edge 10.

Underneath the receiving space floor 6, the actuation member 3 makes a single piece with a disklike collar 15, acting as a piston. Specifically, a lower surface 16 of the flange 15 acts as a piston surface, while another cuplike piece 17 forms the cylinder space. This appears in particular from a comparison of FIGS. 1 and 2, also.

The cylinder space 18 can admit hydraulic fluid via several radially distributed hydraulic lines 19.

At the top of the collar 15, guide pins 30 are anchored, which insert into guide bores 31 underneath the bottom 6. This prevents a radial movement in the peripheral direction between the components.

In the application represented for the actuation mechanism 1 in a machine tool for actuation of a chuck, the actuation member 3 rotates together with the receiving space 2 and the cuplike components 5 and 17, so that no relative motion occurs between them. Furthermore, it will be noticed that a pressurized oil intake 32 is fashioned at one end and an oil leak drain 20 at the opposite end of the rotating union 21. The pressurized oil intake 32 is connected to a hydraulic line in order to connect hydraulic oil and transmit hydraulic pressure. Underneath is formed a (normal) radial seal 25, on top of which a ball bearing 24 is arranged, at a spacing from another ball bearing 23. Another radial seal is also provided at the other end.

The packing is made tight radially inwards via narrow-slit seals (labyrinth seals) 33.

The drawing also shows that the cuplike component 17 having an elongated body 22, is connected to the cuplike component 5 by means of screws 27 distributed about the periphery. Furthermore, as is not shown in detail, elements such as pretensioning pins can be provided, by means of which the receiving space 2 can be changed in volume, regardless of an actuation process. In this way, it is possible to change the admission pressure of the medium contained in the receiving space 2.

FIG. 3 shows in cross section a preassembled cartridge 34, which can be used to transmit force or to open and tighten a device. The preassembled cartridge 34 has a receiving body 35, configured as a cylinder in the sample embodiment. As a brace, in the device in which the preassembled cartridge 34 is installed, the receiving body 35 has a support flange 36, formed at the periphery. Furthermore, it has an mounting flange 37. Moreover, there is a ram 38 which can move relative to the receiving body 35, passing centrally through the receiving body 35. The ram 38 is particular into one end position, in the sample embodiment, in the direction of the end of the receiving body 35, outfitted with the flanges 36 and 37. Between the receiving body 35 and the rod 38 is formed a receiving space 39, which is filled with an elastically compressible fluid, the aforesaid silicone oil. Moreover, the ram 38 projects beyond the receiving body 36 at one end, where it has a connection point 39'. In the sample embodiment, the connection point 39' is provided by a threading formed at one reduced end of the ram 38. As is described in detail further on, the ram 38 can be joined in this way to a mechanical part of a machine in which the preassembled cartridge 34 is installed.

At the other end, the ram 38 has a pistonlike flange 40, which is guided as a cylinder in the receiving body 35. On the outside, the flange 40 can be operated in conventional manner, e.g., with customary hydraulic means, to move the ram against the compression of the silicone oil in the receiving space 39. As can be noticed, the flange 34 is in normal fashion guided radially by guide slots and made tight by seals.

FIG. 4 shows another cross section of an alternative preassembled cartridge. In this embodiment, the ram 38 is formed as a differential piston. It has a first diameter D3 and a second diameter D4. Upon actuation or movement of the ram 38 in the sample embodiment, referring to the figure, moving toward the right, the segment in the receiving space 39 that has the diameter D4 increases and at the same time the segment having the diameter D3 decreases (both times, as regards the active length in the receiving body 35). This occasions a compression of the silicone oil enclosed in the receiving space 39 and, therefore, an increase in the pretensioning force acting on the ram 38 in the direction of a movement to the left of the example shown.

In further detail, the ram 38 in the example of FIG. 4 is hollow on the inside and has an internal bore 41, for conducting a lubricating agent or a hydraulic agent for additional processes downstream. Moreover, it will be noticed that the projecting end is again fashioned as a connection point. In this example as well, the connection has a threading. Moreover, it will be seen that the receiving space 39 has a fill opening 42 with a check valve 43. Through this, the silicone oil can be introduced inside the receiving space. A suitable measure has also been adopted to drain away the displaced air. Generally, this involves a onetime filling, which need no longer be replenished or replaced over the lifetime of the preassembled cartridge.

In further structural detail, the ram 38 can be activated via a hydraulic double piston 44, 45. Through an intake 46, hydraulic fluid can be admitted to the double pistons 44, 45. The pistons then act on the ram 38, via the flanges 47, 48. Furthermore, there is an intake 49 for another fluid, a lubricating coolant in the example shown. The lubricating coolant arrives in the central bore 50 of the double piston 44, 45 and from there goes to the bore 41 of the ram 38. The double piston is provided in the example shown, in order to apply the necessary force in view of the diameter of the preassembled cartridge.

A stroke monitoring 52 is provided at the rear of the ram 38 or the extension 51 passing through the double piston 44, 45. Upon movement of the ram 38, this can detect the relative movement, e.g., from the stationary lines 46 and 49, as a measure of the stroke.

Figure 5:
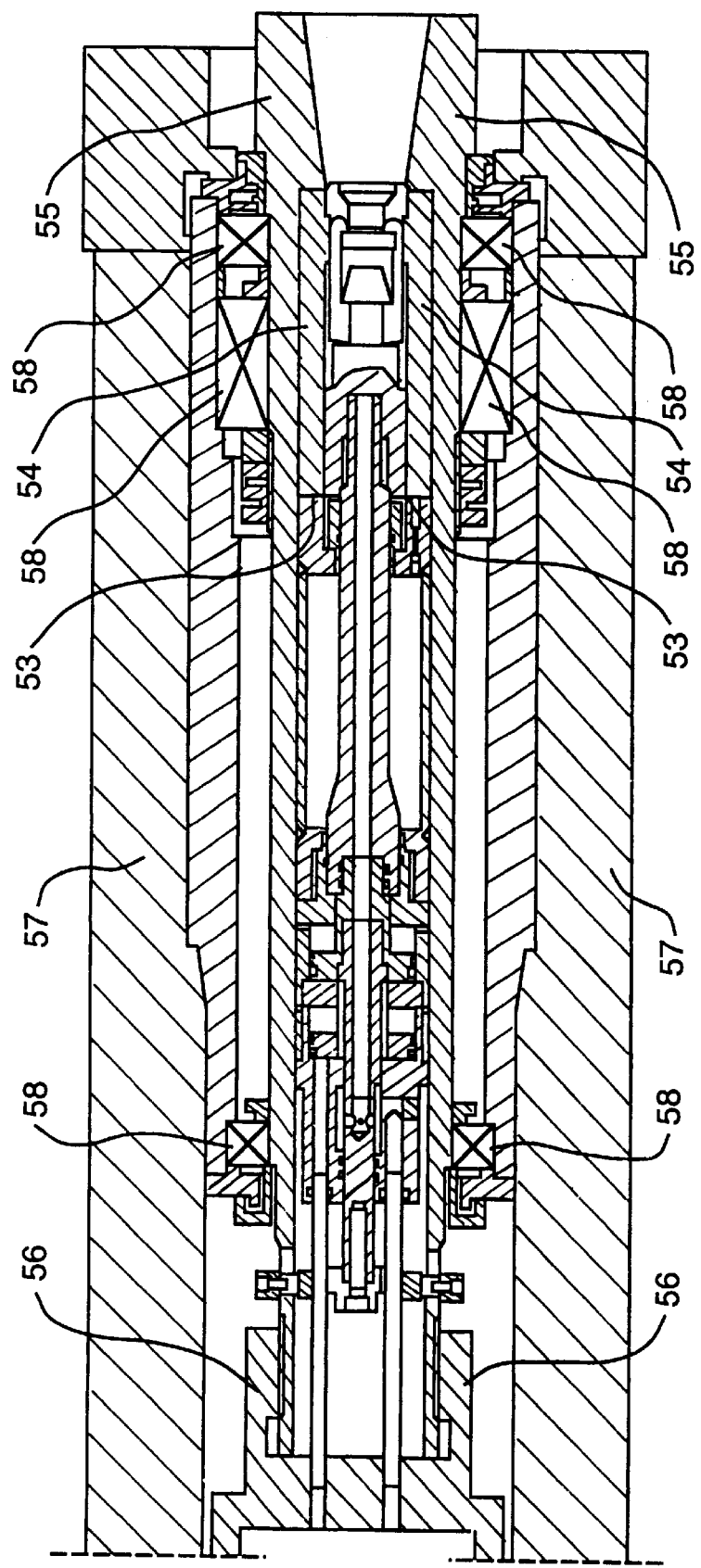
FIG. 5 shows the preassembled cartridge of FIG. 4, built into a machine tool.

In the representation of FIG. 5, the preassembled cartridge of FIG. 4 is represented in the installed condition. As can be seen, the preassembled cartridge abuts with one front end 53 of the filling body 35 against a machine bearing element 54 or 55, being joined to an anchor 56 at the rear, providing a kind of counterbearing. Moreover, it can be seen that the preassembled cartridge, together with the parts 54 and 55, are able to turn relative to machine housing 57. For this, roller bearings 58 are individually provided, for example.

Figure 6:
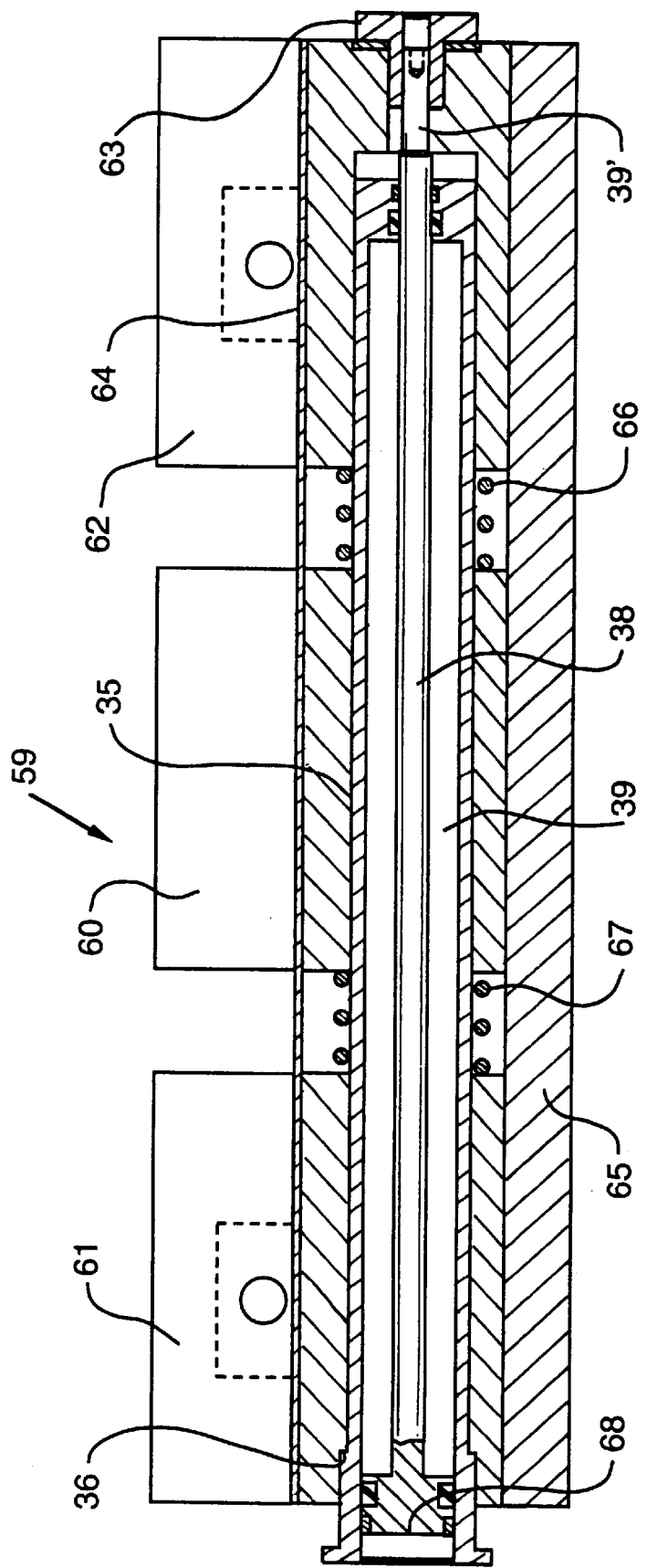
FIG. 6 shows a work-clamping device in cross section, outfitted with a preassembled cartridge per FIG. 3.

The representation of FIG. 6 shows a partially schematic cross sectional view of a work-clamping device 59 in the form of a screw head. Specifically, the work-clamping device has a fixed jaw 60 and two movable clamping jaws 61 and 62. Integrated in the work-clamping device 59 is a preassembled cartridge, as has been described above with reference to FIG. 3.

In the subject of FIG. 6, the receiving body 35 is joined at one end to the first movable clamping jaw by the counterbearing 36 and acts on this, while at the other end the ram 38 is screwed to its connection point 39' by a retaining and set screw 63, which in turn thrusts against the movable clamping jaw 62 and acts on it. The part 64 merely represents a surface of separation. The movable jaw 62 influences (in a way not shown) the part 64 and thus can move in the described manner via the ram 38. While the clamping jaws 61 and 62 are arranged so that they can slide relative to the bottom piece 65, the fixed jaw 60 is joined firmly to the bottom piece 65. The relative position from the fixed jaw 60 is maintained by interposed pressure springs 66, 67.

FIG. 6 represents the actuated position, i.e., a hydraulic opening pressure acts on the flange 68 of the ram 38. In this way, the ram 38 is pushed relative to the receiving housing 35 so that a larger end piece, matched up with the connection point 39, protrudes from the receiving housing 35. At the same time, the housing 35 has been pushed relative to the fixed jaw 60 and also the movable clamping jaw 62, at the same time carrying along the movable clamping jaw 61. This exerts control via the pressure springs 66 and 67. At the same time, the movement has produced an increased restoration pressure by elastic compression of the silicone oil in the receiving space 39. As soon as the hydraulic pressure eases on the flange 68, the ram 38 is pushed to the left in FIG. 4 and the clamping jaws 61 and 62 are guided against the fixed jaw 60, clamping any work located in between.

Another preferred embodiment of the present vise-like workholder is depicted in FIGS. 7–25. As can be seen in those Figures, the workholder 100 preferably comprises a bottom piece or base member 110 that has a longitudinal slot 112 extending the length thereof. The base member 110 supports a preassembled cartridge or clamping assembly 120 that is received within the longitudinal slot 112. The clamping assembly 120 preferably includes a receiving body or spring tube 122 that defines an elongated receiving space 124. One end of the spring tube 122 preferably has a threaded flange 125 that is adapted to threadably receive an end cap assembly 140 that forms a piston-receiving cavity 142. See FIG. 10.

A center jaw 160 is non-movably attached to the upper surface of the base member 110 by means known in the art. In a preferred embodiment, a cover plate 170, of the type disclosed in U.S. Pat. No. 5,442,844 to George R. Swann, issued Aug. 22, 1995, the disclosure of which is herein incorporated by reference, is preferably received on the base member 110 between the base member 110 and the center jaw 160. See FIG. 8. Those of ordinary skill in the art will appreciate that the cover plate 170 serves to prevent debris and chips created during the machining process from accumulating in the longitudinal slot 112 while also providing a positive stop means for the movable jaw members as will be explained in further detail below.

In this embodiment, the base member 110 slidably supports a first slide member 180. More specifically, the first slide member 180 has a body portion 182 that has a longitudinal bore 184 therethrough that is sized to slidably receive the spring tube 122 therein. One end of the first slide member 180 is adapted to abut the threaded flange 124 of the spring tube 122 that forms the piston-receiving cavity 142. The first slide member 180 further includes a tower portion 186 that is preferably integrally formed with the body portion 182. The tower portion 186 extends out of the longitudinal slot 112 and through a corresponding slotted opening 172 in the cover plate 170 to support a first jaw member 188 thereon. It will be appreciated that opening 172 in the cover plate 170 is sized to permit the first slide member 180 to travel a predetermined axial distance within slot 112. In this embodiment, the first jaw member 188 is removably attached to the tower portion 186 by a removable pin (not shown). The specific details of such jaw attachment arrangement can be gleaned from U.S. Pat. No. 5,024,427 to George R. Swann, issued Jun. 18, 1991, the disclosure of which is herein incorporated by reference. The skilled artisan will appreciate, however, that other known jaw attachment methods may also be employed without departing from the spirit and scope of the present invention.

Similarly, a second slide member 190 is slidably supported on the spring tube 122. More specifically, the second slide member 190 has a body portion 192 that has a longitudinal bore 194 therethrough that is sized to slidably receive the spring tube 122 therein. The end of the second slide member 190 that is adjacent to an end of the base member 110 has a bore 196 that smaller than the diameter of the spring tube 122 to form an abutment surface 197 that is adapted to engage the end of the spring tube 122. The second slide member 190 further includes a tower portion 198 that is preferably integrally formed with the body portion 192. The tower portion 198 extends out of the longitudinal slot 112 and through a corresponding slotted opening 174 in the cover plate 170 to support a second jaw member 200 thereon. It will be appreciated that the slotted opening 174 in cover plate 170 is sized to permit the second slide member 190 to travel a predetermined axial distance within the slot 112. The second jaw member 200 is preferably removably attached to the second tower portion 198 in the same manner employed to attach the first jaw member 188 to the first tower 186. The ends of the first and second slide members (180, 190) that face each other each have a bore (189, 199), respectively therein that is adapted to received a corresponding end of a compression spring 202 supported on the spring tube 122 between the first and second slide members (180, 190). The purpose of the compression spring 202 will become apparent as the present Detailed Description proceeds.

Figure 10:
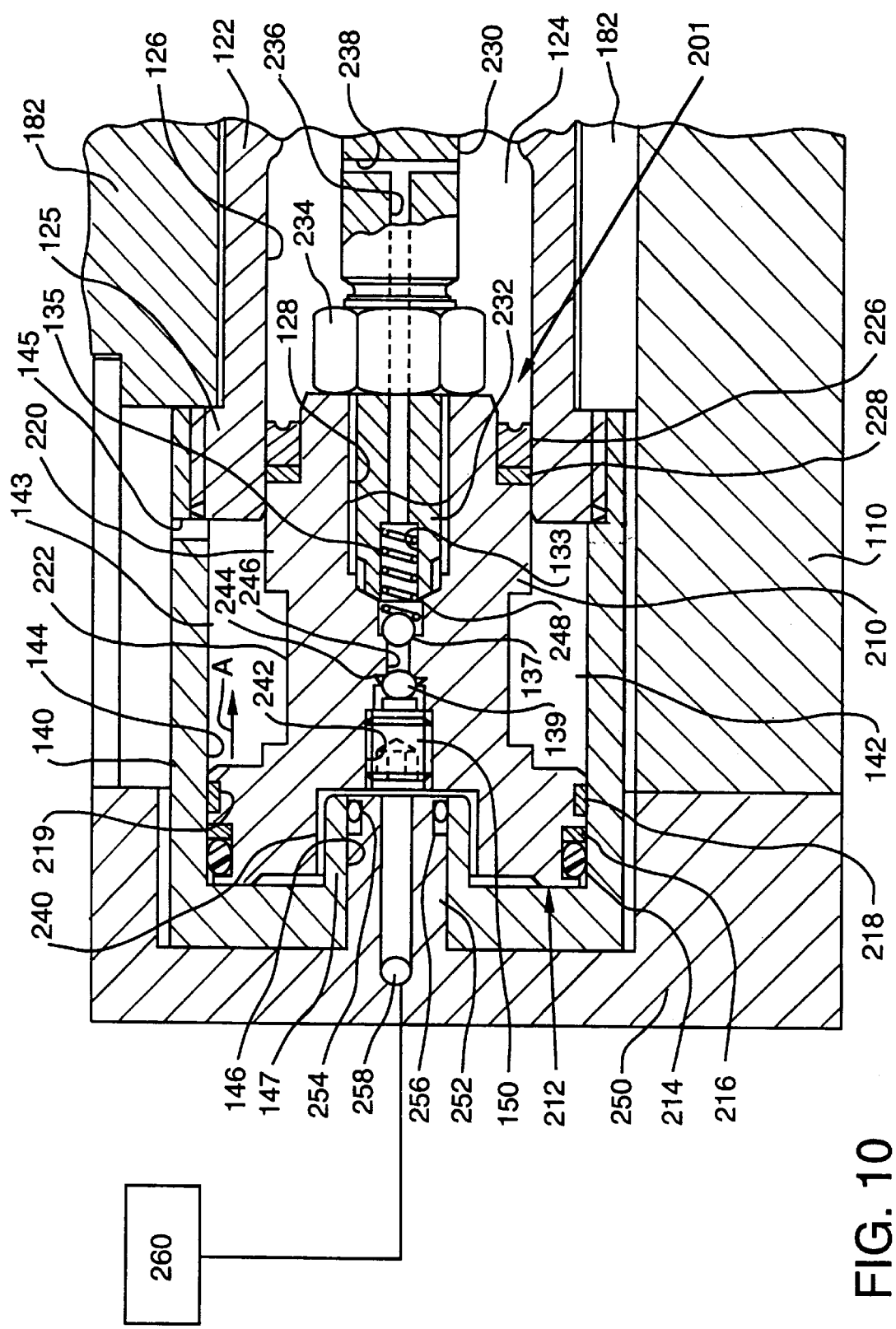
FIG. 10 shows an enlarged cross-sectional elevational view of an end of a preferred vise-like workholder of the present invention showing some elements thereof in full view.
Figure 11:
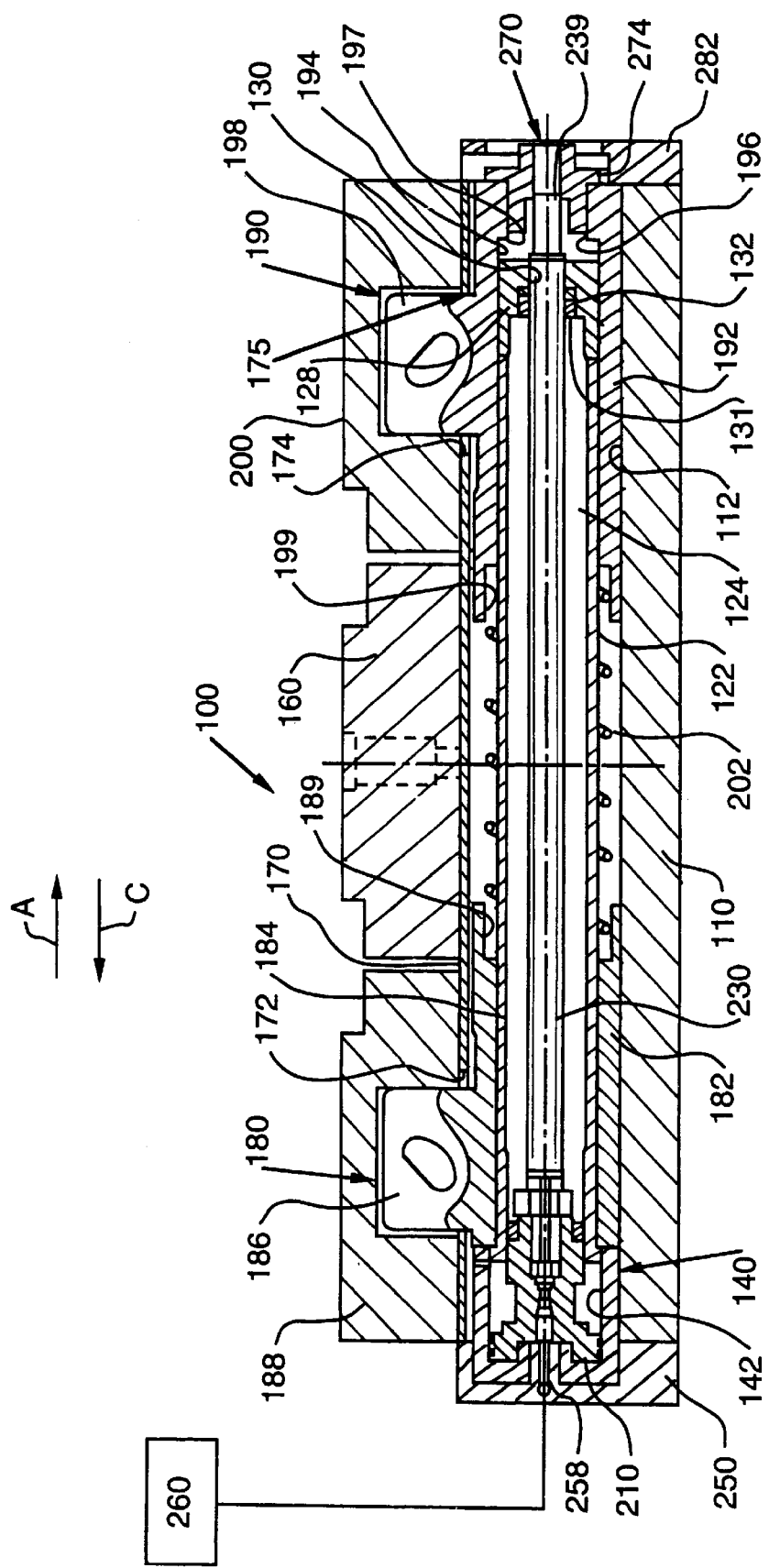
FIG. 11 shows a partial cross-sectional side elevational view of the vise-like workholder of FIGS. 7–10 with the end stop slide member removed.

Also in this embodiment, a piston 210 is attached to a rod 230 to form a piston and rod assembly 201 that is slidably supported within the spring tube 122. As can be seen in FIG. 10, piston 210 has a head portion 212 that is slidably supported within the piston-receiving cavity 142 of the spring tube 122. A substantially fluid-tight slidable seal is preferably achieved between the piston head 212 and the inner wall 144 of the piston-receiving cavity 142 by an O-ring 214 and backing ring 216 as shown in FIG. 10. However other seal arrangements could also be successfully employed. In this embodiment, a ring bearing 218, preferably fabricated from a Teflon® and bronze material is mounted in a circumferential groove 219 formed in the piston head 212. Piston 210 also has a body portion 220 that is sized for sliding engagement with the interior wall 126 of the spring tube 122. In addition, to facilitate attachment of the piston 210 to the rod 230, wrench flats 222 are preferably machined into the body portion 220 so that a wrench can be used to grip the piston 210 during assembly. See FIG. 10. The body portion 220 of piston 210 is also sized to receive a commercially available wiper seal 226 and backing ring 228 for achieving a slidable, substantially fluid-tight seal between the piston body 220 and the inner wall 126 of the spring tube 122.

The skilled artisan will appreciate that piston 210 is adapted to slidably reciprocate within the piston-receiving cylinder 142 in response to the admission and withdrawal of hydraulic fluid under pressure into the fluid-receiving portion 141 of the piston-receiving cavity 142 that is between the end of the end cap assembly 140 and the piston head 212. To enable air to be vented from the portion 143 of the piston-receiving cavity 142 when the piston is slidably advanced in the direction represented by arrow "A" in FIG. 10, a vent passage 145 is provided through the wall of the end cap assembly 140.

The rod 230 is attached to the piston body 220 and extends longitudinally through the hollow spring tube 122. The free end of rod 230 protrudes from the spring tube 122 through a bore 130 in the end 128 of spring tube 122. A substantially fluid-tight seal is preferably achieved between the rod 230 and the end 128 of the spring tube 122 by a commercially available wiper seal 132 and backing ring 134 that are supported within a counter bore 131 in the spring tube 122. See FIG. 11. The seal 132 serves to define a substantially fluid-tight cavity 124 within the spring tube 122 for receiving a silicone oil of the type disclosed hereinabove. Preferably, rod 230 is supported within the spring tube 122 by an annular support member 123 that has a series of passages therein for permitting the silicone material to flow therethrough.

As can be most particularly seen in FIG. 10, piston 210 has a first axial threaded bore 128 that is adapted to receive a threaded end 232 of the rod 230. In addition, a "jam" nut 234 is threaded onto the rod end 232 to lock the rod 230 to the piston 210 to thereby form the piston and rod assembly 201. After the piston and rod assembly 201 have been inserted into the spring tube 122, the silicone is pumped into the cavity 124 through an axial bore 236 in the rod 230 that communicates with a radially extending passage 238. See FIG. 10. The silicone is prevented from exiting cavity 124 by a check valve and plug arrangement housed within the piston body 220. In a preferred embodiment, the piston body 220 is provided with a series of coaxially aligned bores (240, 242, 244, 246). As can be seen in FIG. 10, bore 240 is sized to receive an inwardly protruding port-receiving portion 144 of the end cap 140. Coaxially aligned with the bore 240 is a smaller diameter threaded bore 242 that is adapted to receive a threaded plug member 150. Bores (244, 246) are coaxially aligned with bores (240, 242) and are sized relative to each other as shown in FIG. 10. When the end of rod 230 is threaded into bore 128 in the piston body 220, bores (240, 242, 244, 246) are coaxially aligned with a counter bore 133 that is provided in the end of rod 230. It will be appreciated that bore 133 communicates with bore 236 in the rod 230. A compression spring 135 is supported within bore 133 to bias a ball member 137 into sealing engagement with the bottom of bore 248 to establish a fluid-tight seal with the bore 246. To further seal bore 246, a second ball member 139 is placed within bore 244 and is retained in sealing engagement with bore 246 by the plug member 150.

The procedure for filling the receiving space 124 with silicone oil will now be described. The skilled artisan will appreciate that to gain access to the end of the piston head 212, the end cap 140 must be detached from the threaded flange 125 of the spring tube 122. The plug member 150 is removed from the piston head 212 along with the second ball 139. A conventional grease fitting (not shown) may then be threaded into the bore 242 to enable a conventional grease gun to be attached thereto. As the silicone oil is pumped through the grease fitting into the bore 246, it forces the first ball 137 out of sealing engagement with the bottom of bore 248 thereby enabling the silicone oil to flow past the ball 137 through bores (133, 236, 238) and ultimately into the receiving cavity 124. After the desired amount of silicone oil has been pumped into the cavity 124 (i.e., 252 milliliters of silicone oil for a spring tube having a receiving cavity with a volume of milliliters), the grease fitting is removed. After the source of silicone oil has been removed, the spring 135 biases the first ball 137 into sealing engagement with the bottom of bore 248. The skilled artisan will appreciate that by manually biasing the first ball 137 out of sealing engagement with the bottom of bore 248, air and other gasses that are contained within the receiving cavity 124 can be vented therefrom. Thereafter, the second ball 139 is then reinserted into bore 244 and the plug 150 is threaded into bore 242. Thereafter, the end cap 140 is attached to the threaded flange 125 of the spring tube 122.

As can be seen in FIGS. 7–25, a manifold cap 250 is attached to the end of the base member 110 by conventional means (preferably by cap screws). Manifold cap 250 preferably has an inwardly projecting nipple 252 that is sized to be slidably received within a bore 146 in port receiving portion 147 of the end cap 140. A substantially fluid-tight sliding seal is achieved between the nipple 252 and the bore 146 by an O-ring 254 and backing ring 256 as shown in FIG. 10. Manifold cap 250 also has an axial passage 258 that extends through the nipple 252 to communicate with the piston-receiving cylinder 142. The other end of the axial passage is adapted to communicate with a source of pressurized fluid (i.e., hydraulic pump, compressor, etc.) schematically indicated as 260. The skilled artisan will readily appreciate that the word "fluid" as used herein can encompass hydraulic fluid, compressed gases or other compressed fluid mediums. Thus, the scope of protection for the subject invention should not be limited to an apparatus that is actuated by pressurized hydraulic fluid.

In this embodiment, the end 239 of rod 230 that protrudes through bore 130 in the spring tube 122 is threaded and is adapted to threadably receive a threaded set nut 270. As can be seen in FIGS. 12–25, the set nut 270 has a body portion 272 that is adapted to be received in bore 196 in the second slide member 190. The set nut 270 also has a flange 274 that is adapted to selectively bear upon the end of the second slide member 190.

Figure 7:
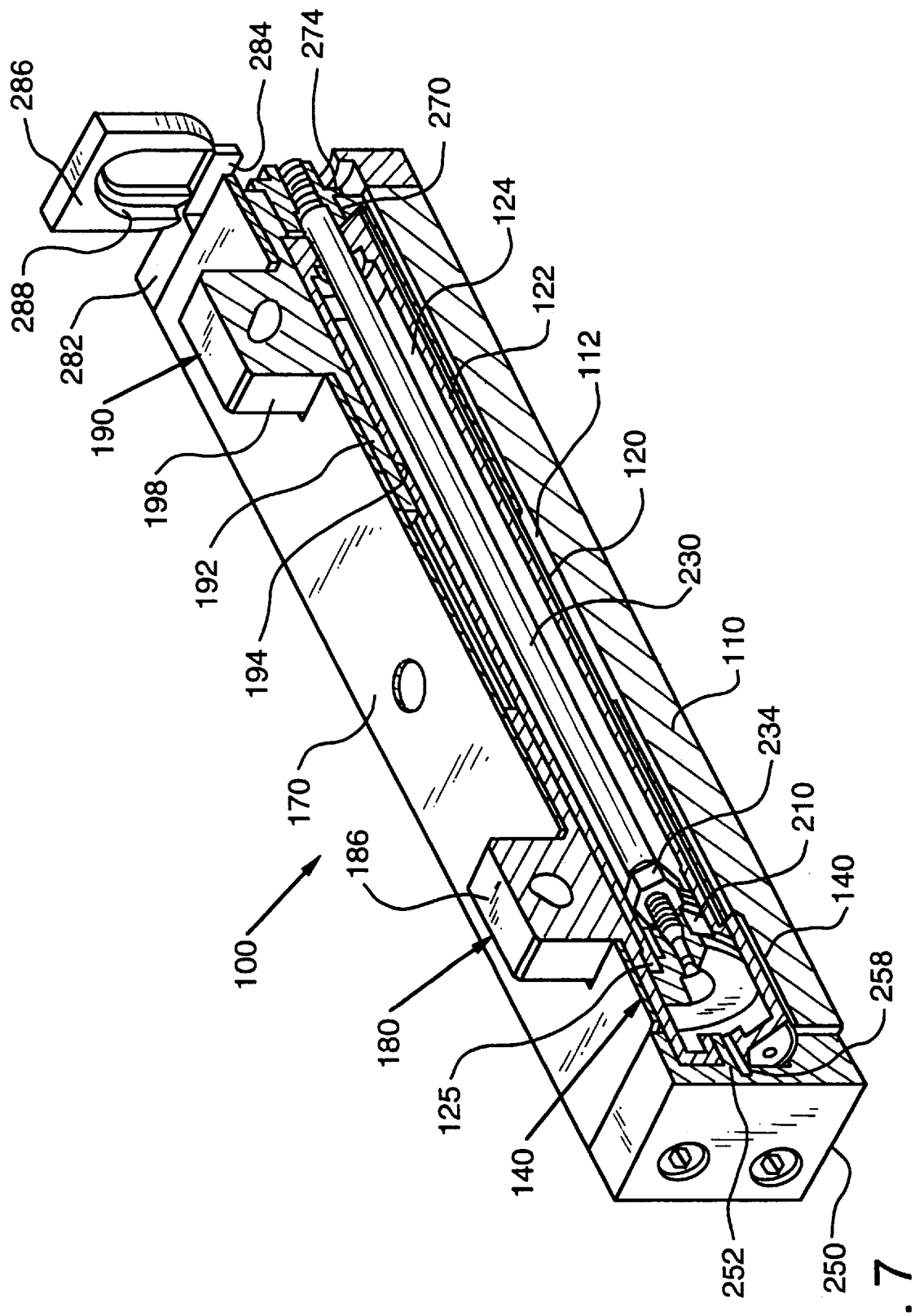
FIG. 7 shows a partial cross-sectional perspective view of a preferred vise-like workholder of the present invention with the jaw members and end stop slide member thereof removed.
Figure 8:
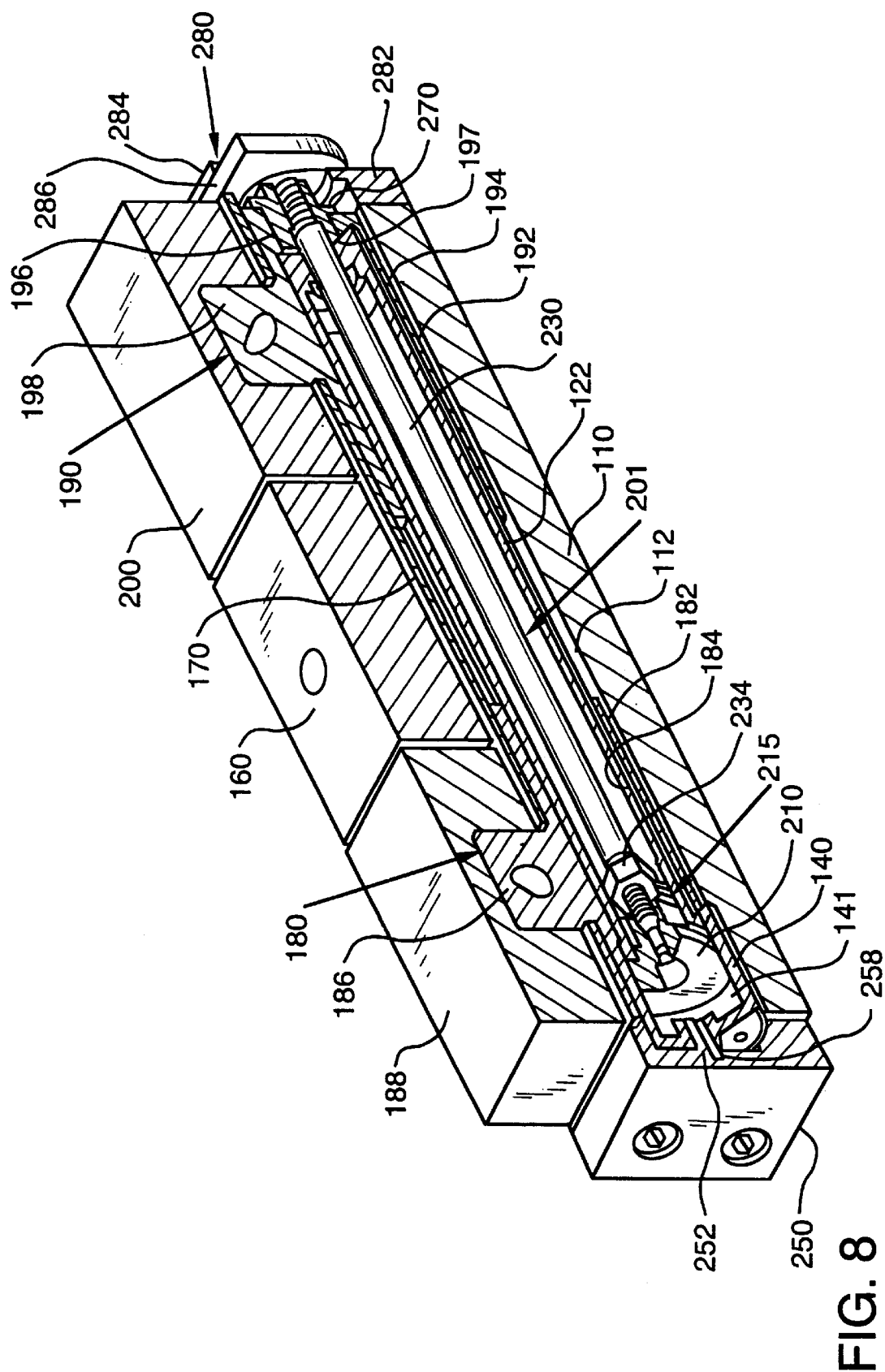
FIG. 8 shows a partial cross-sectional perspective view of the workholder of FIG. 7 with the jaw members and end stop slide member attached.
Figure 9:
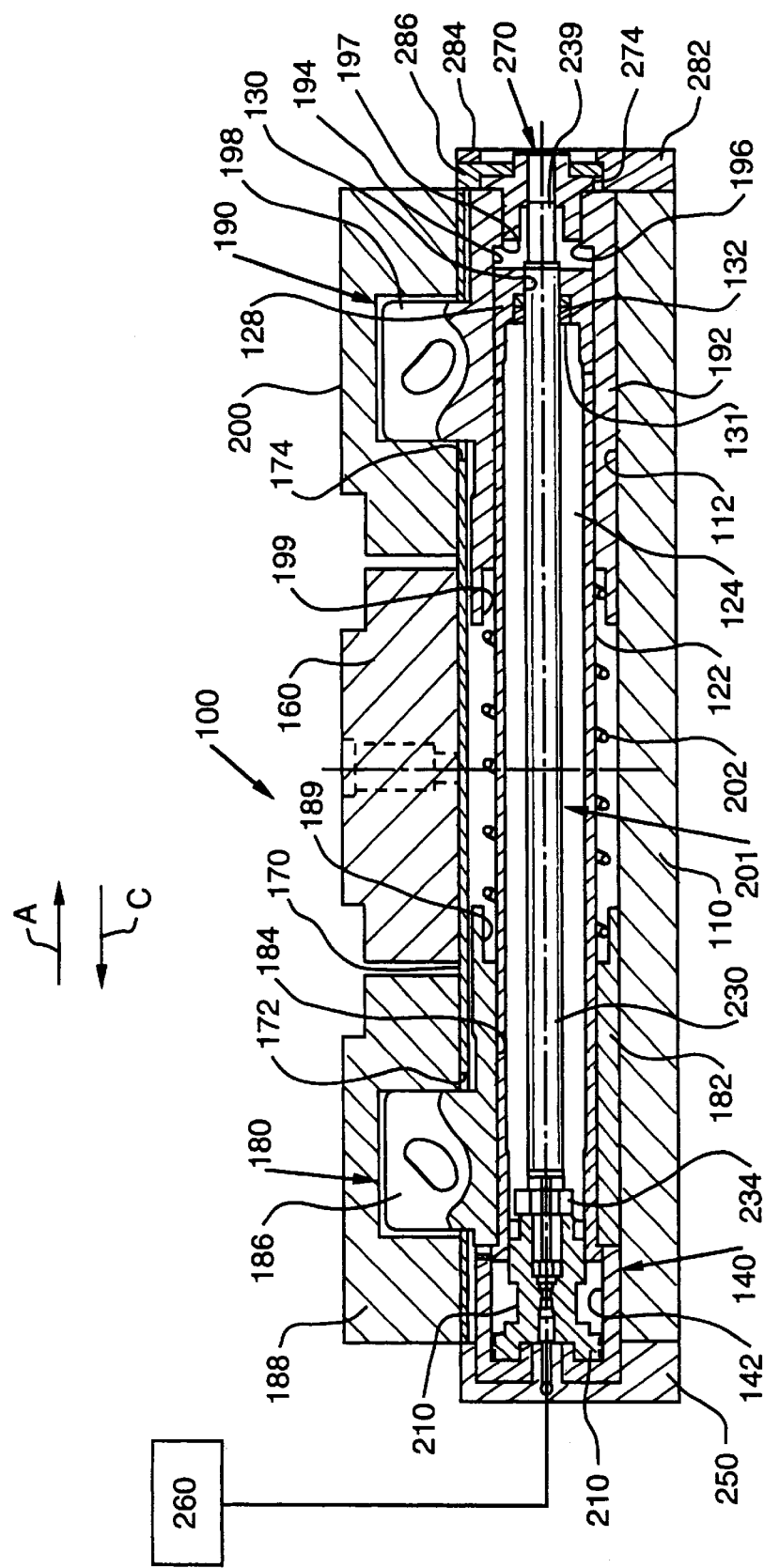
FIG. 9 shows a partial cross-sectional side elevational view of the vise-like workholder of FIG. 8 showing some elements in full view.

In this embodiment, the axial and rotational motion of the set nut 270 is selectively controlled by an end stop assembly generally designated as 280. The end stop assembly 280 preferably comprises a locking plate 282 that is attached to the end of the base member 110 preferably by screws (not shown). As can be most particularly seen in FIG. 7, locking plate 282 has a cavity 284 that is adapted to receive a U-shaped end stop slide member 286. Slide member 286 is preferably configured as shown in FIGS. 7 and 8 and is provided with an undercut portion 288 adapted to engage the flanged portion 274 of the set nut 270 when the slide member 286 is received in the cavity 284. The skilled artisan will appreciate that when the slide member 286 engages the set nut 270 as shown in FIG. 8, the set nut 270 and the rod 230 cannot axially move relative to the base member 110.

Figure 12:
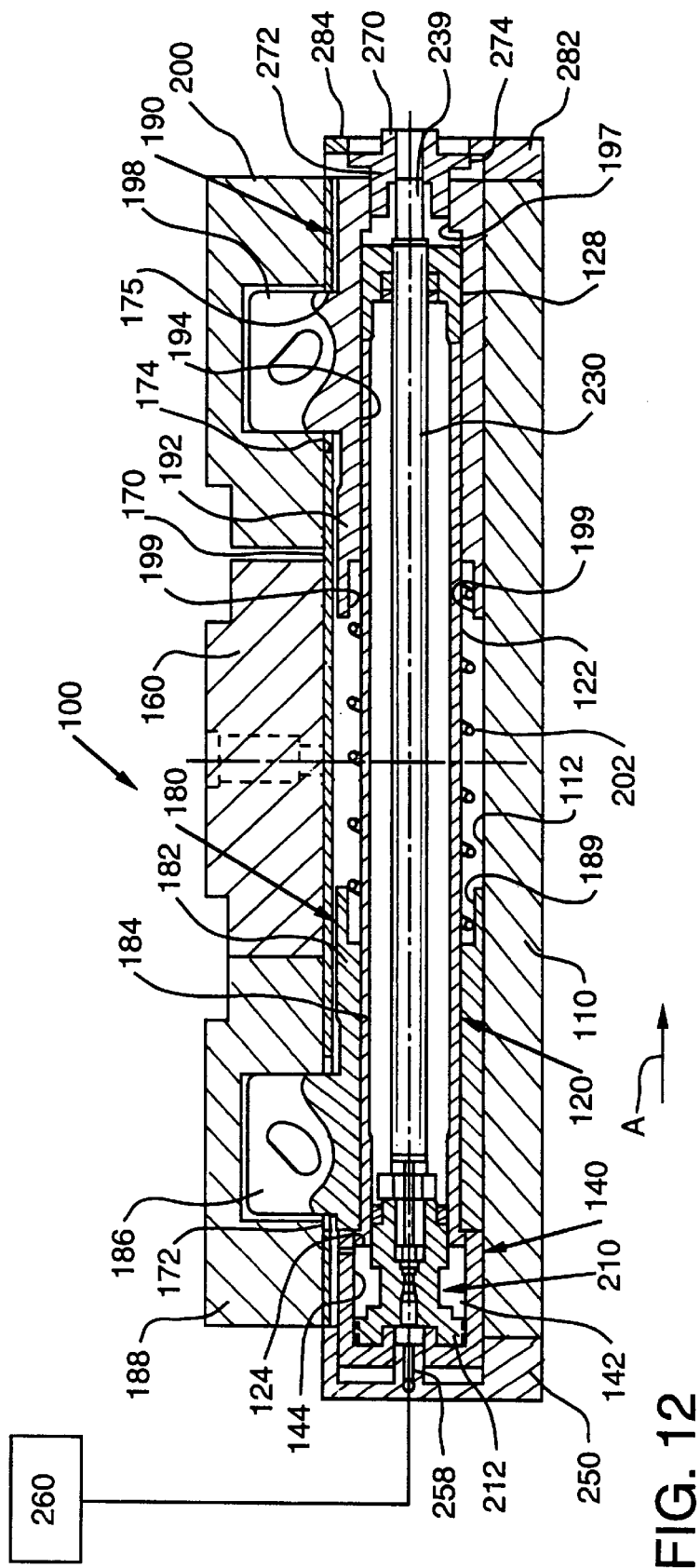
FIG. 12 shows a partial cross-sectional side elevational view of the vise-like workholder of FIGS. 7–11 with the end stop slide member removed and after an initial amount of hydraulic pressure has been applied to the piston-receiving cylinder.
Figure 13:
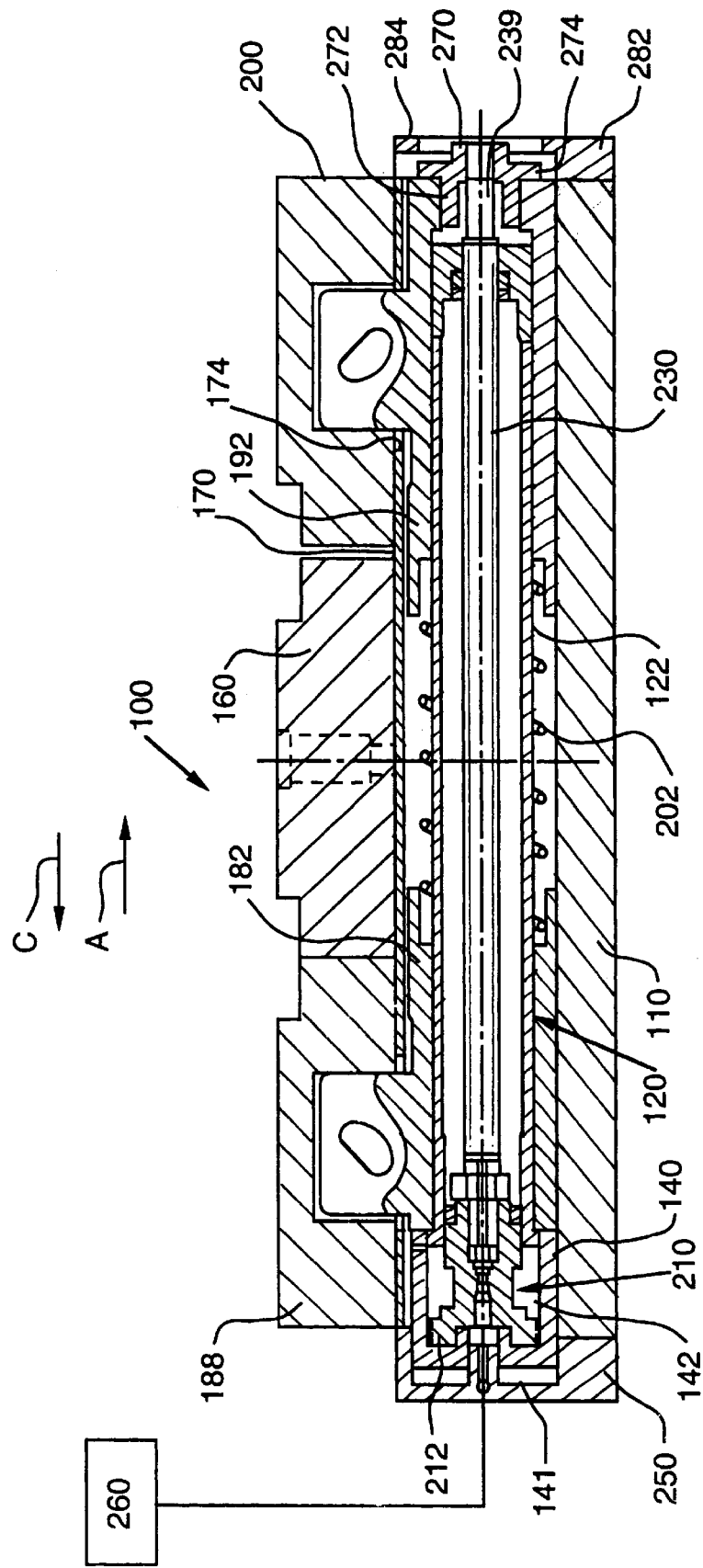
FIG. 13 shows a partial cross-sectional side elevational view of the vise-like workholder depicted in FIG. 12 after the set nut has been screwed into contact with the second slide member.
Figure 14:
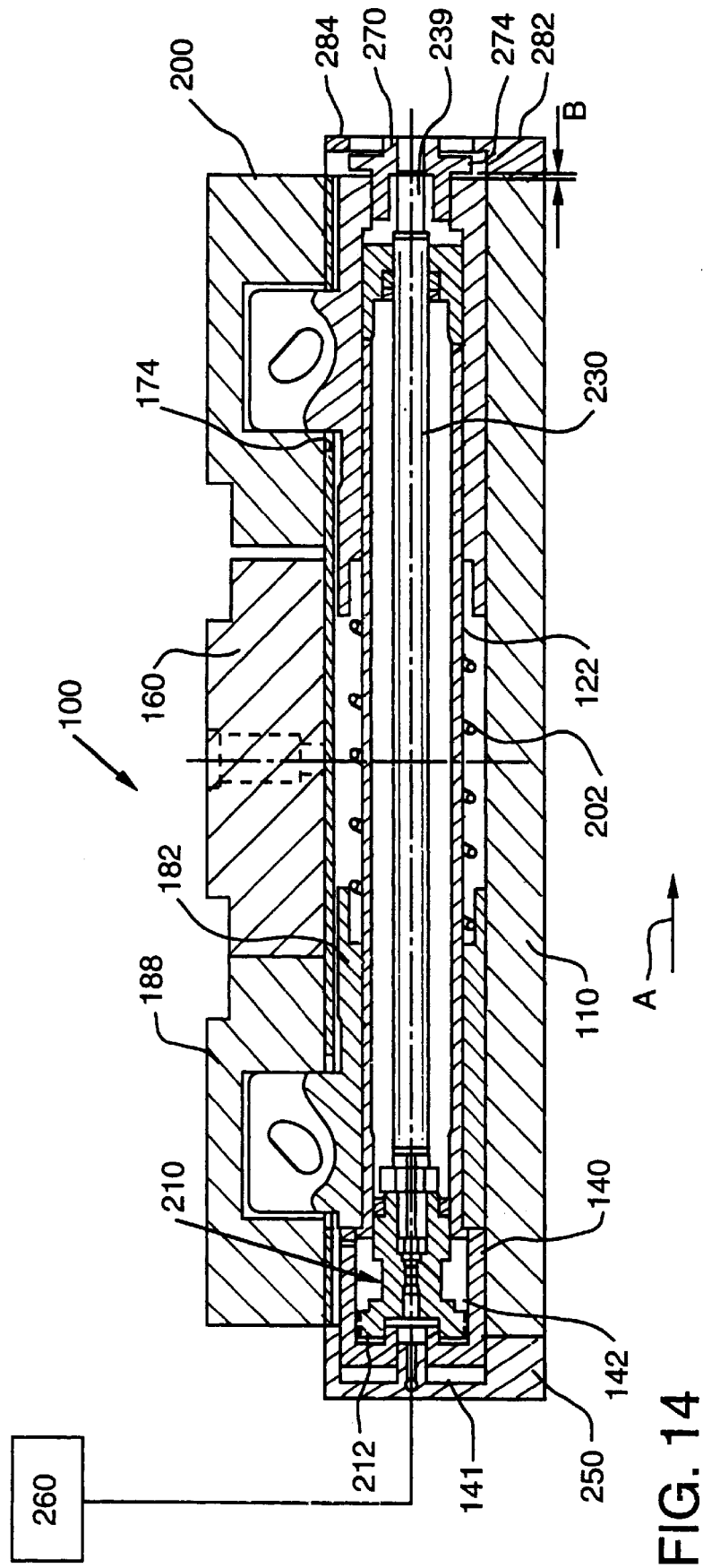
FIG. 14 shows a partial cross-sectional side elevational view of the vise-like workholder depicted in FIG. 13 after the hydraulic pressure to the piston-receiving cylinder has been increased to a predetermined value necessary to advance the piston and rod assembly a predetermined axial distance within the spring tube.
Figure 15:
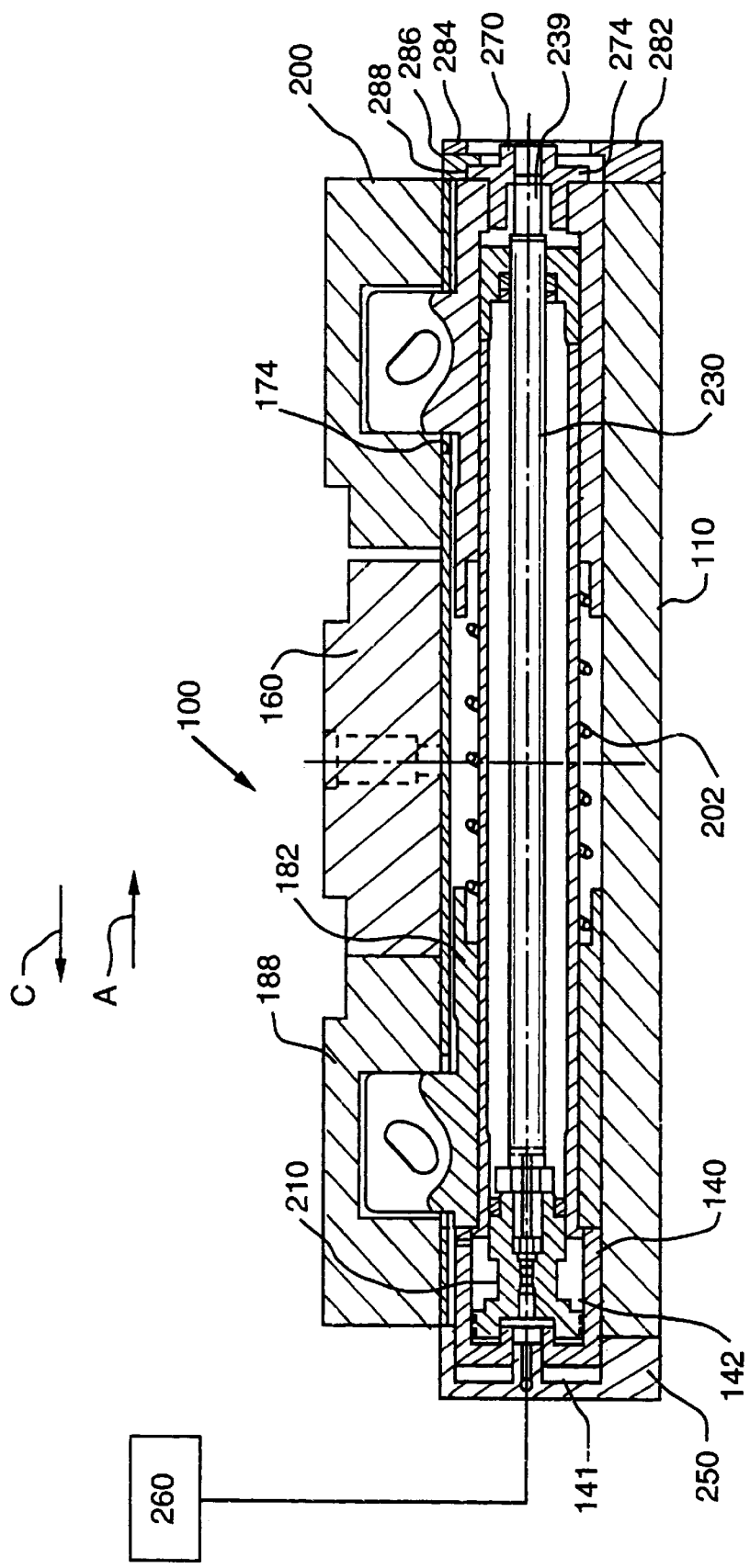
FIG. 15 shows a partial cross-sectional side elevational view of the vise-like workholder depicted in FIG. 14 with the end stop slide member engaging the set nut.
Figure 16:
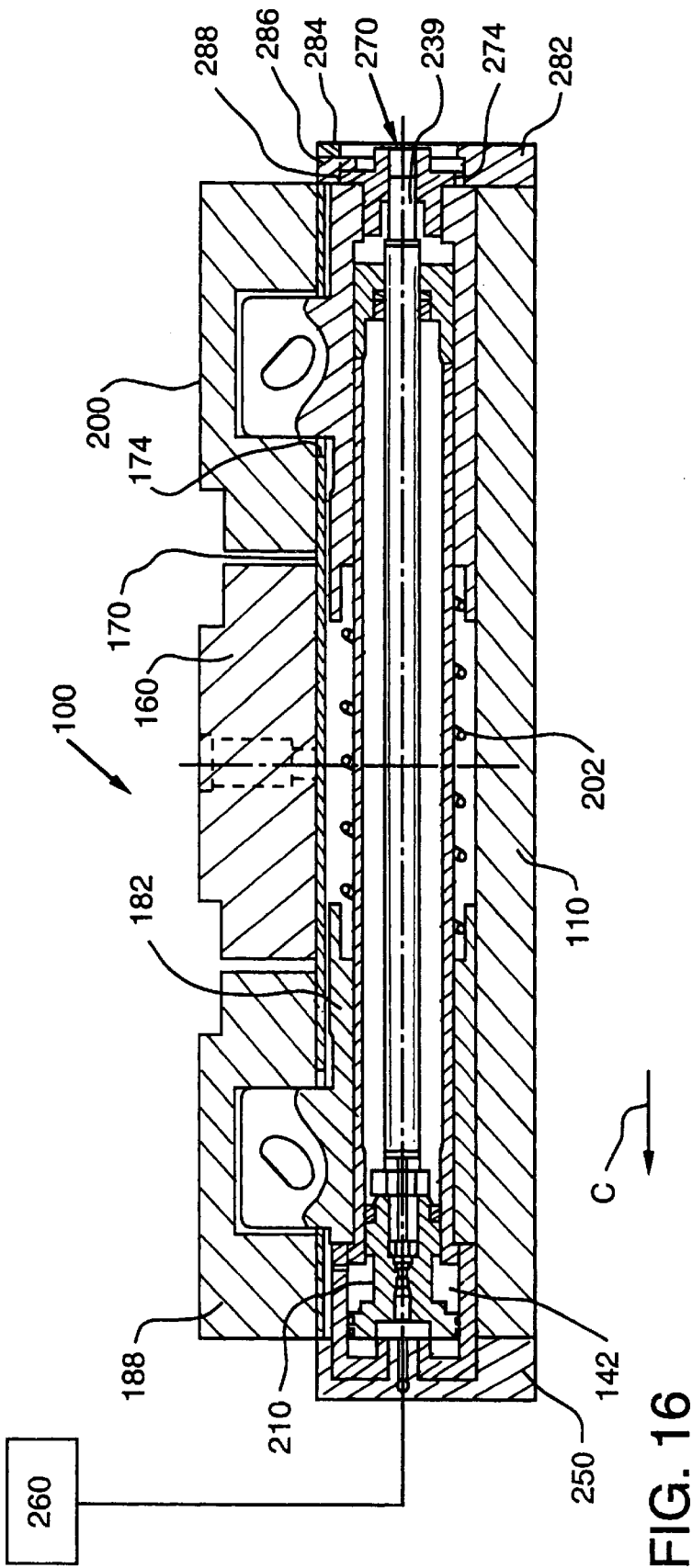
FIG. 16 shows a partial cross-sectional side elevational view of the vise-like workholder of FIG. 15 after the end stop slide member has been reinserted and after the hydraulic pressure has been further increased to a magnitude necessary to cause the first slide member to contact the edge of the corresponding opening in the cover plate and the set nut contacts the end stop slide member to cause both jaws to be completely opened.
Figure 17:
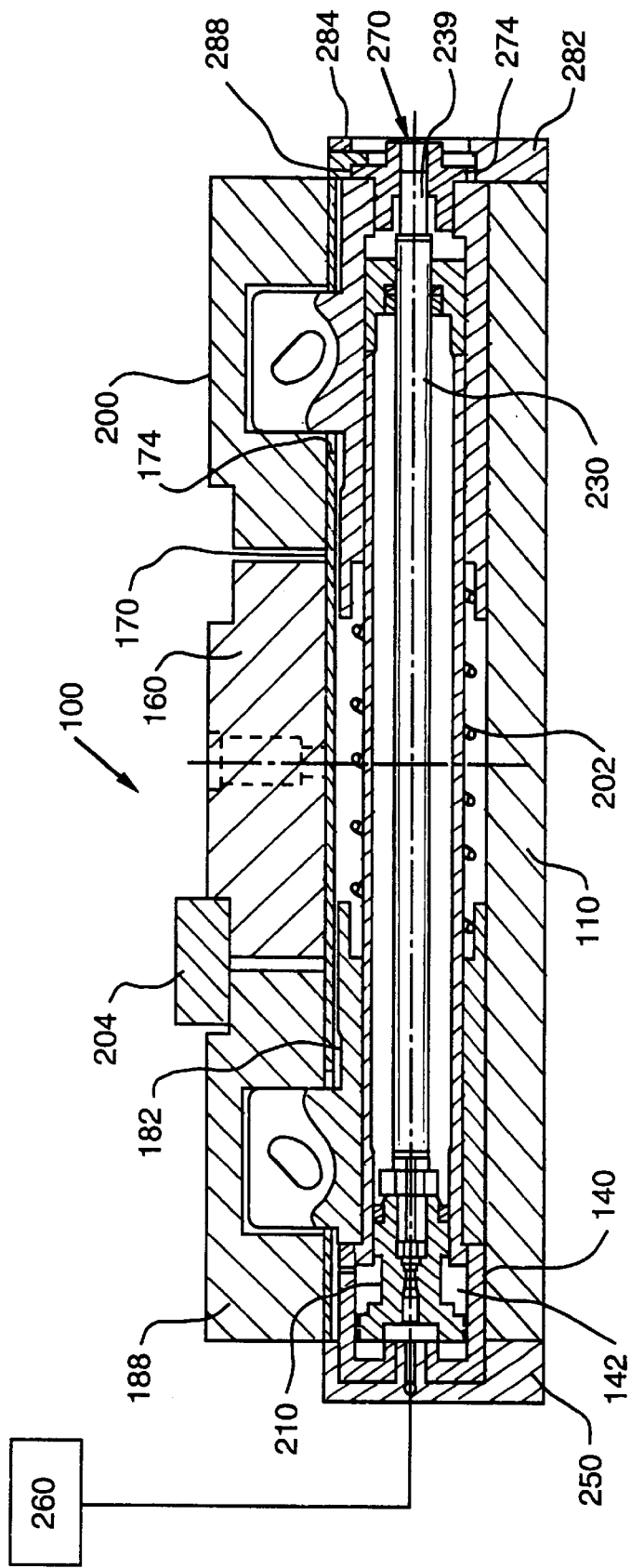
FIG. 17 shows a partial cross-sectional side elevational view of the vise-like workholder of FIG. 16 after a first workpiece has been inserted between the first jaw member and the center jaw member.
Figure 18:
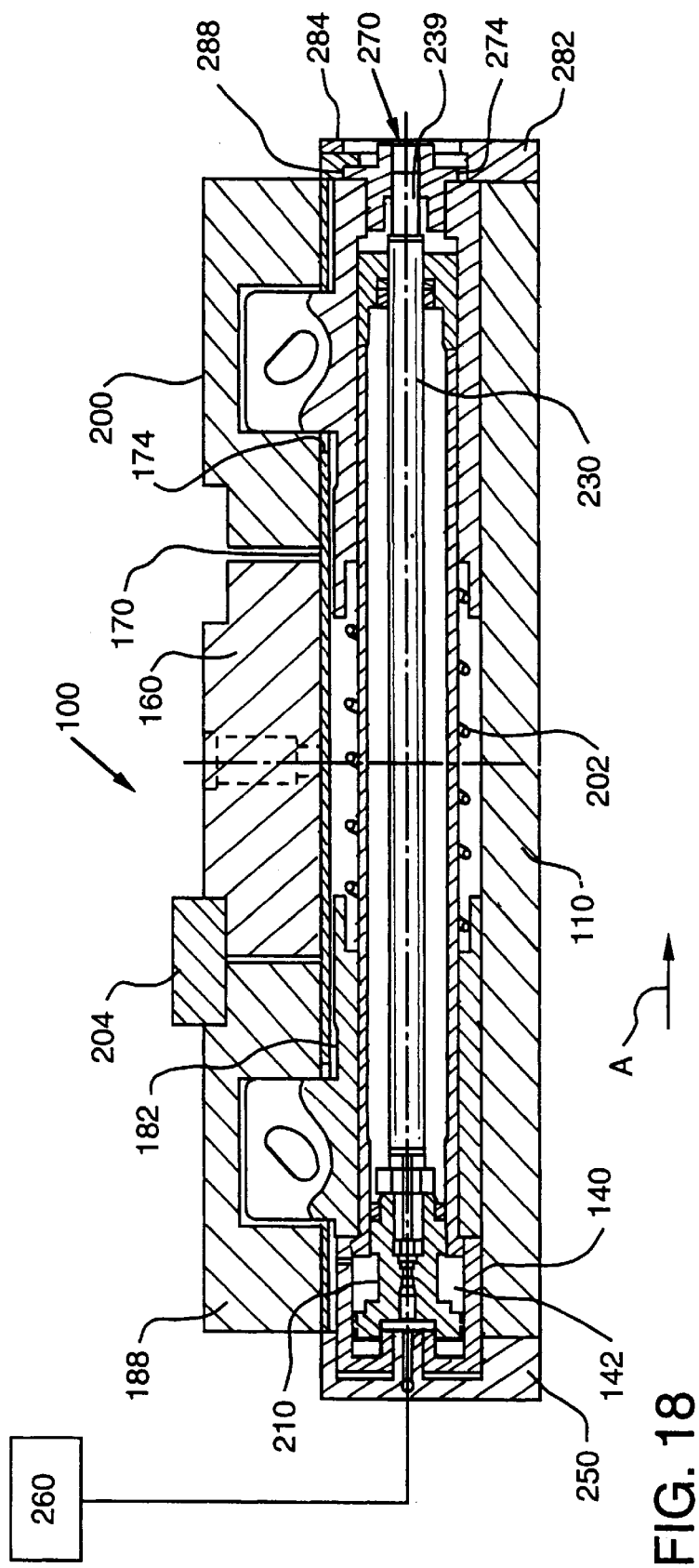
FIG. 18 shows a partial cross-sectional side elevational view of the vise-like workholder of FIG. 17 after the hydraulic pressure has been reduced to a predetermined magnitude to enable the first jaw member to clamp the first workpiece between the first jaw member and the center jaw member.

The operation of this embodiment will now be described. To begin the clamping process, the slide member 286 is removed from the cavity 284 in the locking plate 282 to permit the set nut 270 to turn freely on the rod 230. See FIG. 11. Thereafter, a small amount of hydraulic fluid (i.e., 0.5 milliliters) is pumped under pressure from source 260 into the hydraulic fluid receiving-portion 141 of the piston-receiving cavity 142 through axial passage 258 in the manifold cap 250. The admission of such pressurized fluid into the hydraulic fluid receiving-portion 141 causes the rod 230 and the entire spring tube assembly 122 to move in the direction of arrow "A" as shown in FIG. 12. As the spring tube 122 moves in that direction, the threaded flange portion 125 of the spring tube assembly 122 contacts the first slide member 180 causing it to also move in the "A" direction until the first jaw member 188 contacts the fixed center jaw 160. Such movement of the first slide member 180 bears upon the compression spring 202 which, in turn, urges the second slide member 190 to slide on the spring tube 122 in the "A" direction until it contacts the edge 175 of the opening 174 in cover plate 170. Thereafter, the set nut 270 is threaded further onto the rod 230 until the flanged portion 274 contacts the second slide member 190. See FIG. 13.

The skilled artisan will appreciate that the magnitude of the clamping force generated by the vise 100 can be selectively adjusted by adjusting the position of the set nut 270 on the rod 230. To set the clamping force, additional hydraulic fluid is pumped into the hydraulic fluid receiving portion 141 of the piston-receiving cavity 142 forcing the piston and rod assembly 201 in the "A" direction. Enough hydraulic fluid is pumped into the portion 141 to cause the piston and rod assembly 201 to move in the "A" direction a predetermined distance (preferably approximately 2.5 mm—represented by distance "B" in FIG. 14). Thereafter, the set nut 270 is further threaded onto the rod 230 until it contacts the second slide member 190. The end stop slide member 286 is then reinserted over the set nut 270 to prevent the set nut 270 from moving axially. See FIG. 15. The hydraulic pressure to the hydraulic fluid-receiving portion 141 of the piston-receiving cavity 142 is then increased causing the set nut 270 to move against the end stop slide member 286. As the hydraulic pressure builds within the hydraulic fluid-receiving portion 141, the end cap assembly 140 moves in the direction represented by arrow "C" in FIG. 16, thereby permitting the spring 202 to urge the first slide member 180 away from the fixed center jaw 160. Both jaws (188, 200) are now completely open. See FIG. 16.

After both jaws (188, 200) have been moved to their open positions, a first workpiece 204 is inserted between the first jaw 188 and the center jaw 160. See FIG. 17. The hydraulic pressure to the hydraulic fluid receiving portion 141 is slowly reduced thereby permitting the end cap assembly to move in the "A" direction to engage the body portion 182 of slide member 180 and force the first jaw member 188 towards center jaw 160. Such movement of jaw member 188 results in workpiece 204 being clamped between the first jaw member 188 and the fixed center jaw 160. See FIG. 18.

Figure 19:
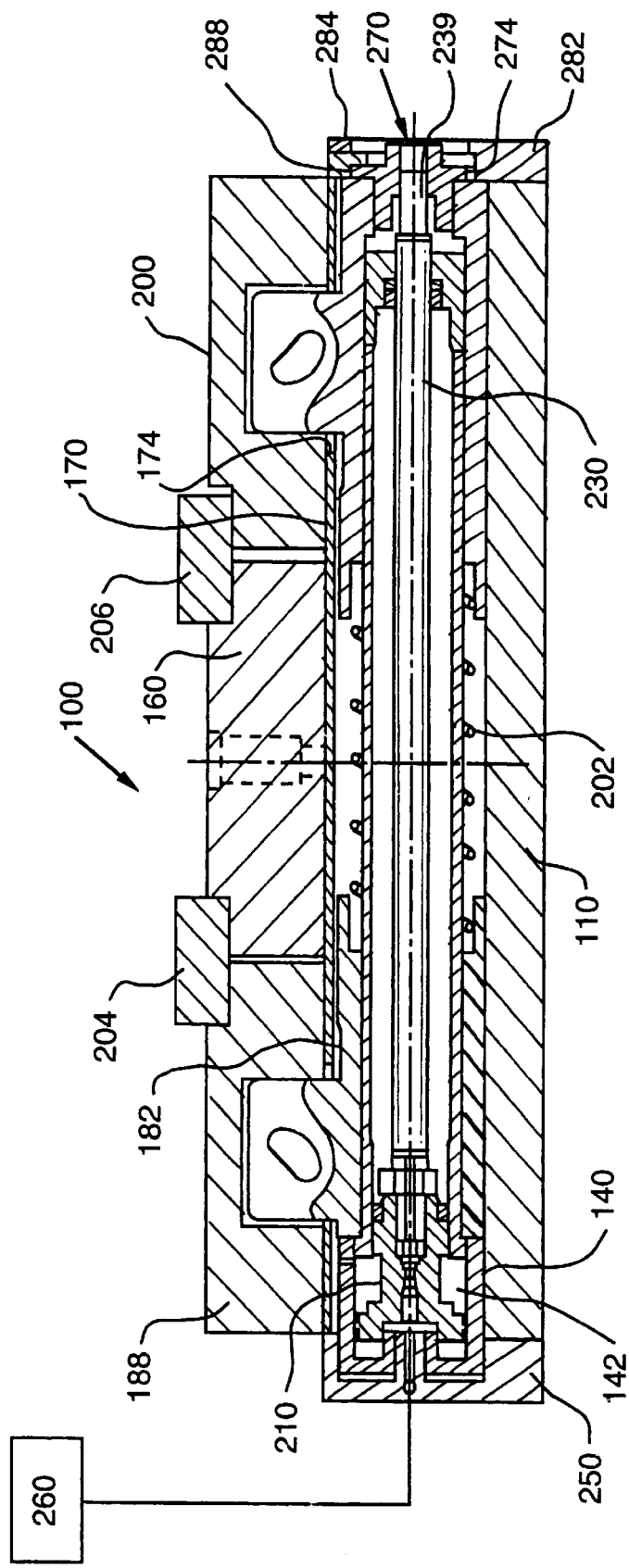
FIG. 19 shows a partial cross-sectional elevational view of vise-like workholder of FIG. 18 with a second workpiece inserted between the center jaw member and the second jaw member.
Figure 20:
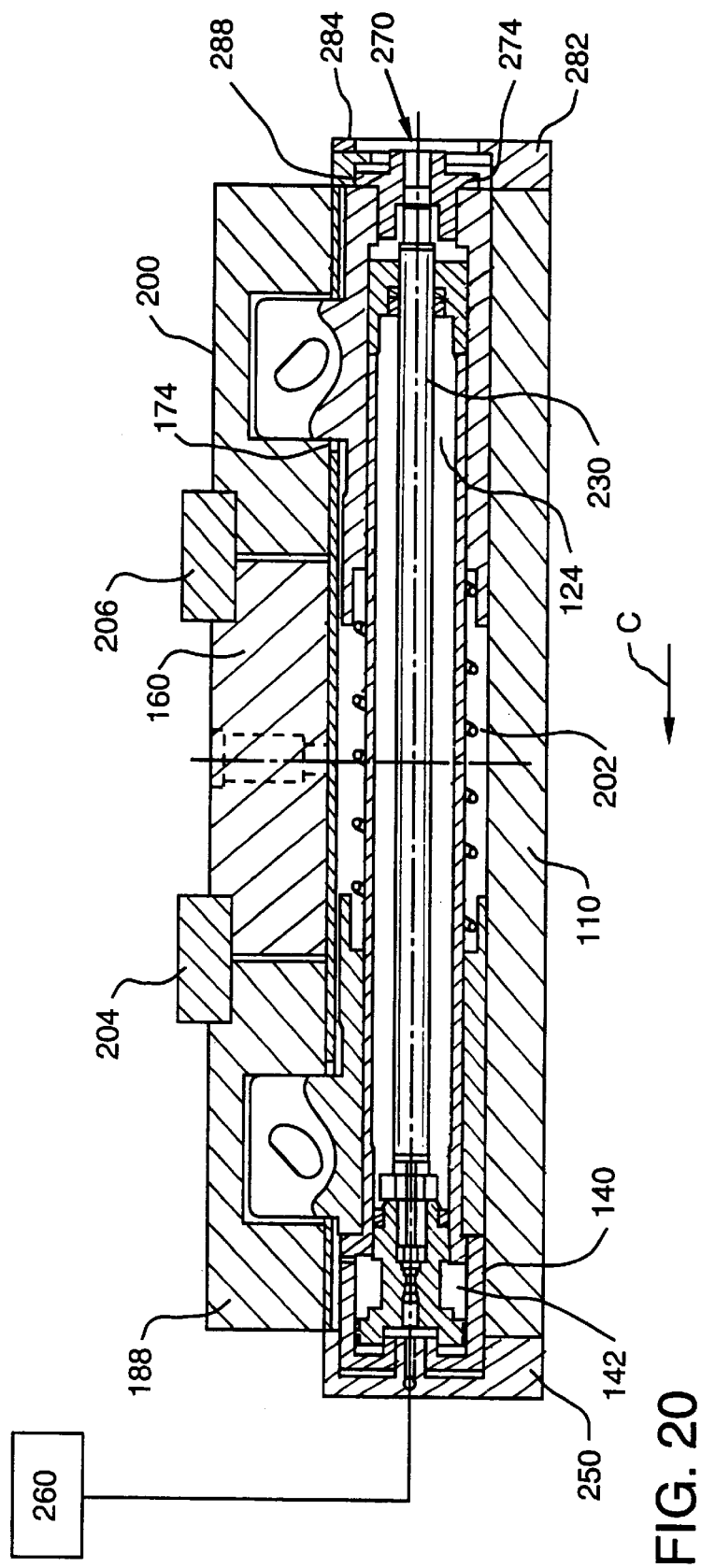
FIG. 20 shows a partial cross-sectional side elevational view of the vise-like workholder of FIG. 19 after the hydraulic pressure to the piston-receiving cylinder has been discontinued thus causing both workpieces to be clamped in position.

After the first workpiece 204 has been clamped between first jaw member 188 and center jaw 160, a second workpiece 206 is inserted between second jaw member 200 and center jaw 160 as shown in FIG. 19. Thereafter, the hydraulic pressure to the hydraulic fluid-receiving portion 141 of the piston-receiving cavity 142 is reduced to zero to thereby permit the piston and rod assembly 201 to be biased in the "C" direction by the compressed silicone oil within receiving space 124. As the piston and rod assembly moves in the "C" direction, the flange 274 of the set nut contacts second slide member 190 and forces the second slide member 190 in the "C" direction to cause the second workpiece 206 to be clamped between the second jaw 200 and the center jaw 160. See FIG. 20. It will be understood that such movement of the second slide member 190 in the "C" direction compress the spring 202.

To remove the workpieces (204, 206), hydraulic fluid under pressure is again supplied from source 260 to the hydraulic fluid-receiving portion 141 of piston-receiving cavity 142 to cause the piston and rod assembly 201 to move in the "A" direction permitting the second slide member 190 to be biased to the open position by spring 202. Further application of hydraulic pressure biases the end cap assembly 140 in the "C" direction thereby permitting spring 202 to urge the first slide member 180 to its open position. The skilled artisan will readily appreciate that the embodiment of the present invention described immediately above provides a vast improvement over prior hydraulically actuated vise-like workholders that will permit workpieces to become unclamped if hydraulic pressure is lost or interrupted to the unit. Workpieces clamped by the present invention, however, will remain clamped under full clamping force when hydraulic pressure is discontinued or interrupted.

Figure 21:
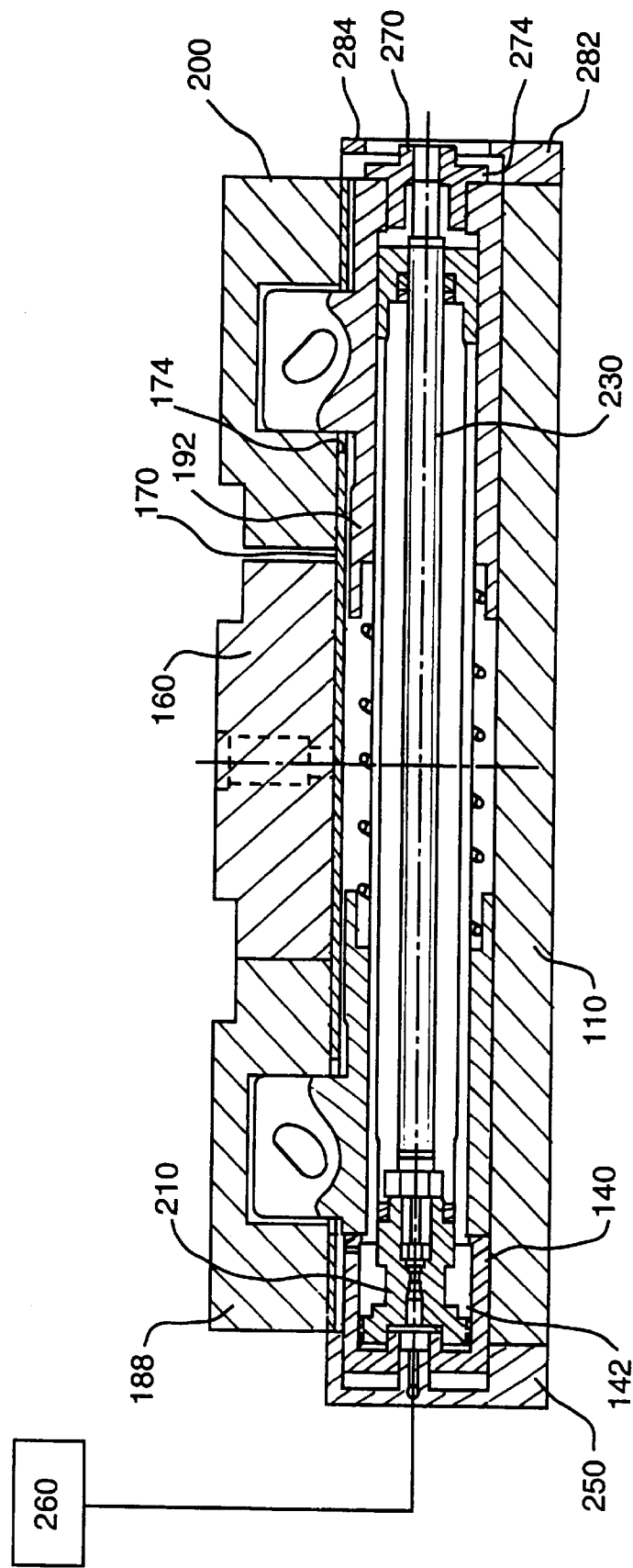
FIG. 21 shows a partial cross-sectional side elevational view of the vise-like workholder of FIGS. 7–20 with no hydraulic pressure applied to the piston-receiving cylinder and the end stop slide member removed.
Figure 22:
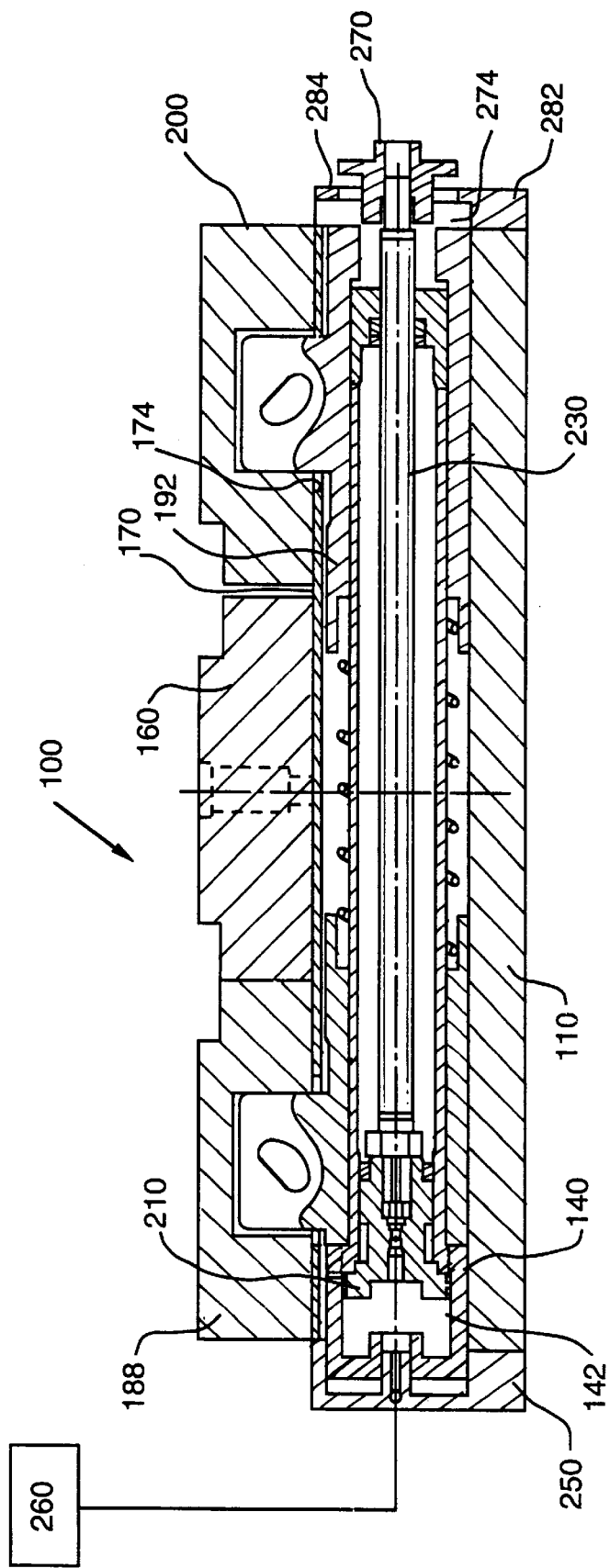
FIG. 22 shows a partial cross-sectional side elevational view of the vise-like workholder of FIG. 21 after the hydraulic pressure to the piston-receiving cylinder has been increased to a magnitude necessary to advance the piston to a point wherein the piston head contacts the bottom of the end cap assembly.
Figure 23:
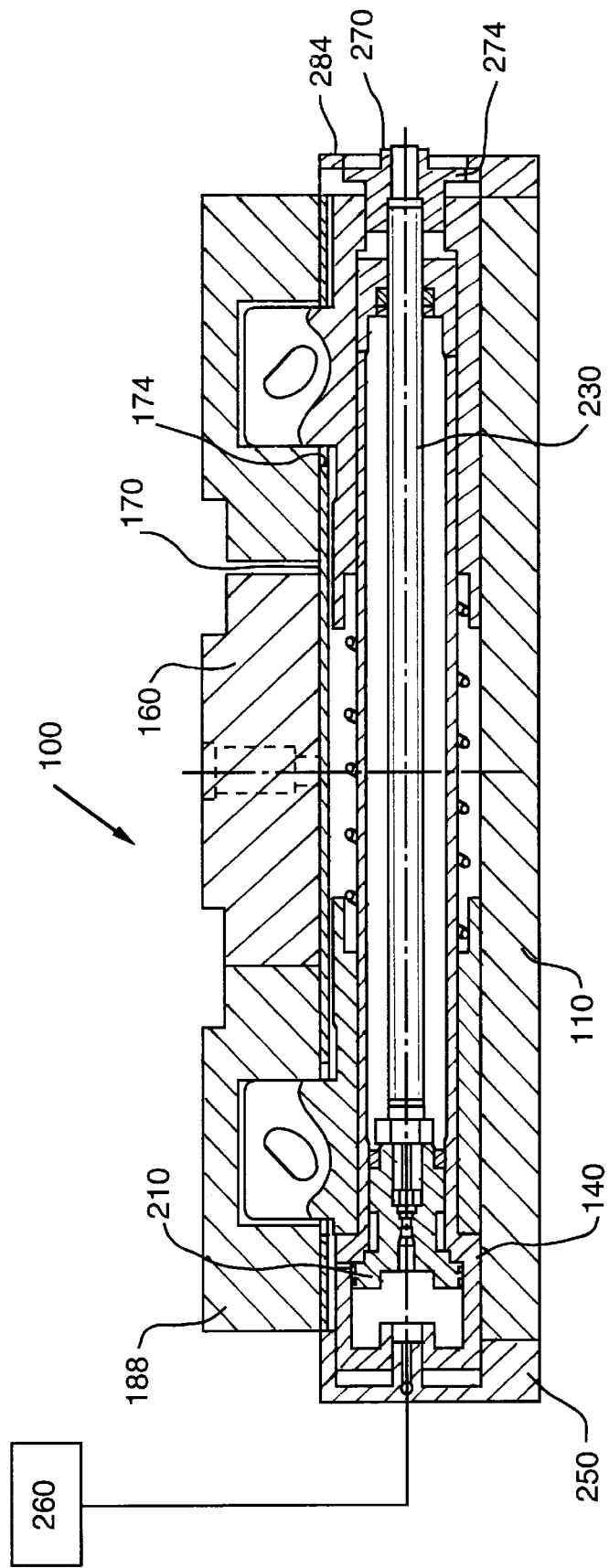
FIG. 23 shows a partial cross-sectional side elevational view of the vise-like workholder of FIG. 22 wherein the set nut is screwed completely onto the threaded end of the rod.
Figure 24:
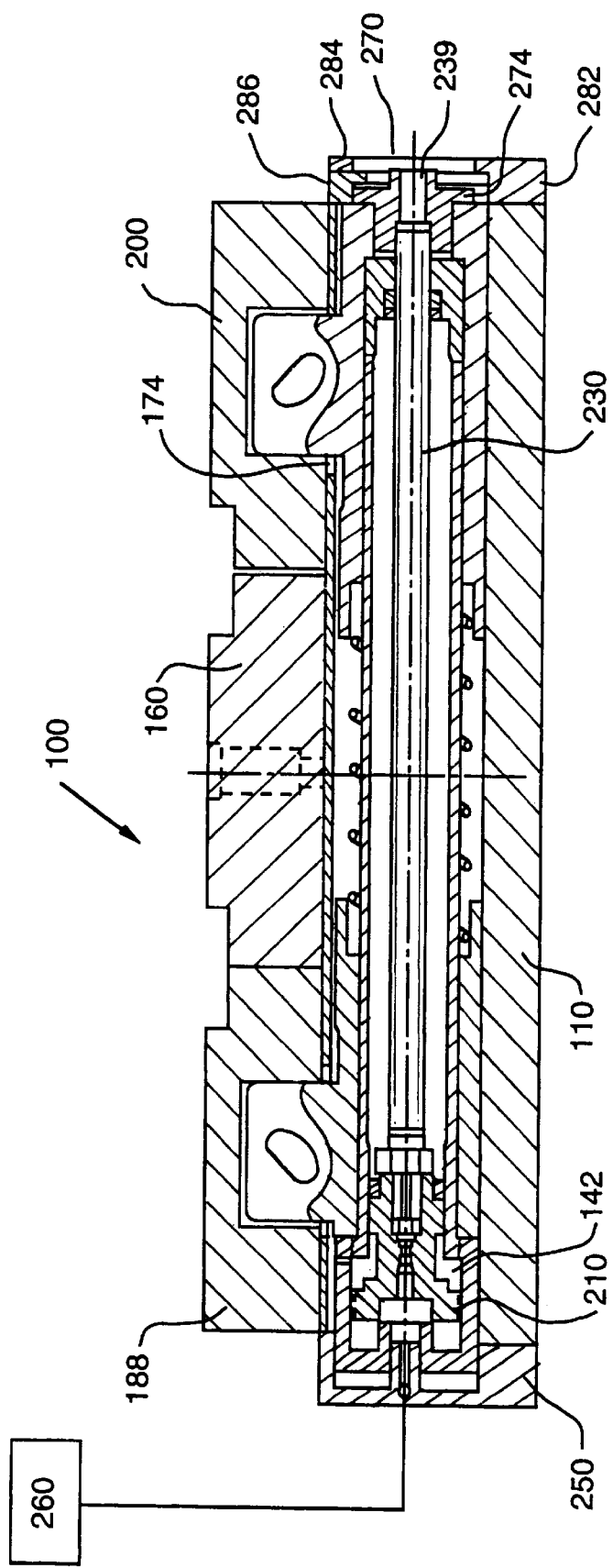
FIG. 24 shows a partial cross-sectional side elevational view of the vise-like workholder of FIG. 23 after the hydraulic pressure to the piston-receiving cylinder has been completely relieved and the end stop slide member has been reinserted.
Figure 25:
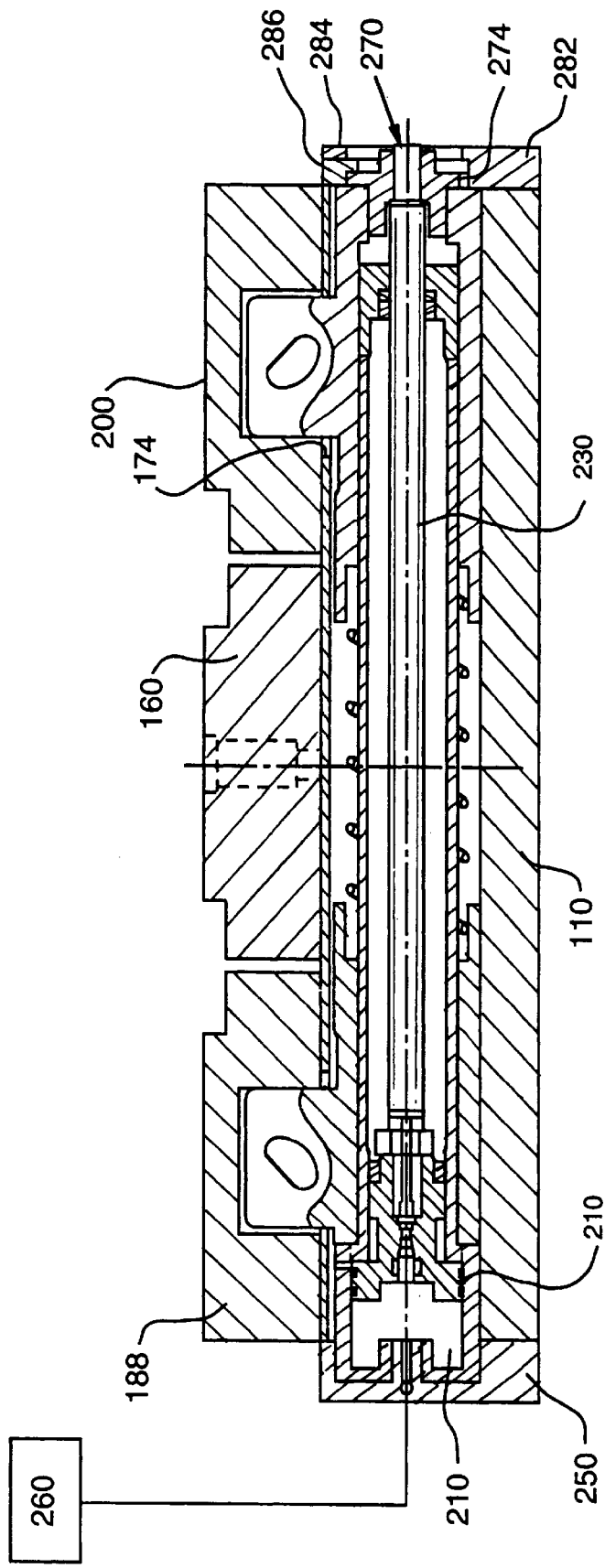
FIG. 25 shows a partial cross-sectional side elevational view of the vise-like workholder of FIG. 24 after full hydraulic pressure has again been applied to the piston-receiving cavity to cause the first and second jaw members to move to their full-open positions.
Figure 26:
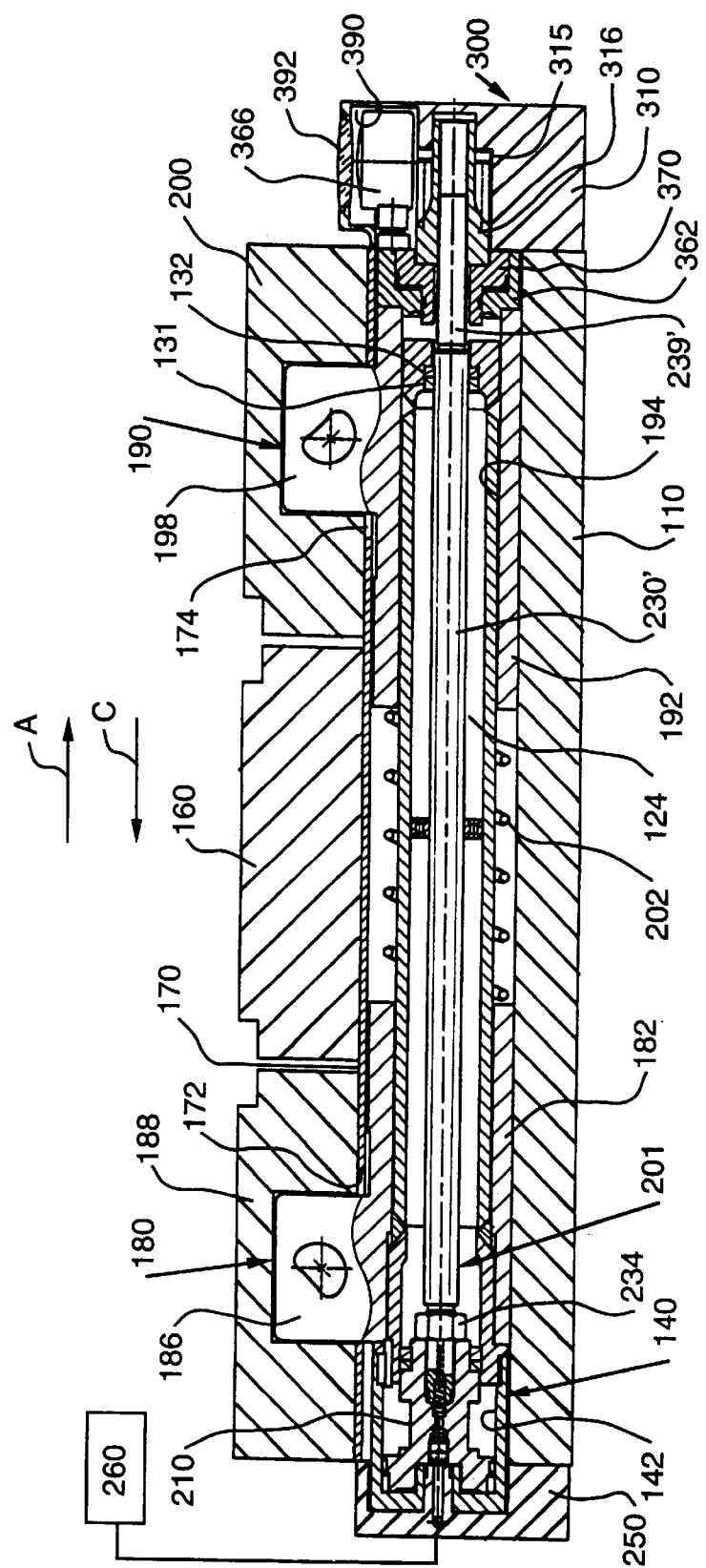
FIG. 26 shows a partial cross-sectional side elevational view of another embodiment of the present invention.

Another advantage provided by this embodiment of the present invention involves the ability to selectively adjust the magnitude of the clamping force generated by the workholder. To adjust the clamping force, the end stop slide 286 is removed as shown in FIG. 21. Thereafter, full hydraulic pressure is applied to the hydraulic fluid-receiving portion 141 of the piston-receiving cavity 142 causing the piston and rod assembly to move in the "A" direction until the first slide member 180 contacts the edge of the opening 172 in the cover plate 170. See FIG. 22. To obtain the maximum available clamping force, the set nut 270 is screwed completely onto the threaded end of rod 230. See FIG. 23. Thereafter, the hydraulic pressure is completely relieved and the end stop slide member 286 is reinserted. See FIG. 24. Full hydraulic pressure is thereafter applied to the hydraulic fluid-receiving portion 141 to cause the jaw members (180, 190) to move to their fully open positions. See FIG. 25. The skilled artisan will appreciate that a variety of different clamping forces may be achieved by altering the position of the set nut 270 on the threaded end portion of rod 239.

FIGS. 26–33 disclose yet another preferred embodiment of the subject invention. The skilled artisan will appreciate that, with the exception of the differences discussed below, the embodiment depicted in FIGS. 26–33 utilizes many of the same components and operates in the same manner as the embodiment depicted in FIGS. 7–25. In this embodiment, however, the set nut has been replaced by a gear assembly 300.

Figure 30:
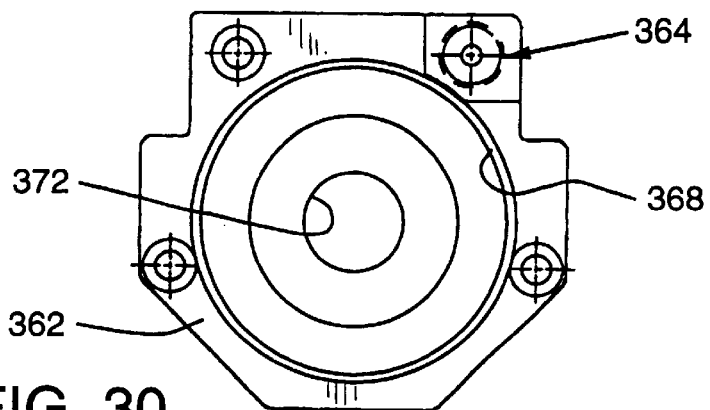
FIG. 30 shows an end view of a preferred mounting block of the embodiment depicted in FIGS. 26–29.

More particularly and with reference to FIGS. 26–29, the gear assembly 300 comprises a housing member 310 that is removably attachable to the base member 110 preferably by cap screws (not shown). Housing member 310 has first and second coaxially aligned bores (312, 314) that are adapted to receive a gear nut 316 that is threaded onto the end of rod 230'. Preferably, a thrust washer 315 is provided in the bore 314 for contact with gear nut 316. As can be seen in FIGS. 29 and 30, gear nut 316 has a threaded central bore 318 adapted for threaded engagement with the threaded end 239' of rod 230'. It will be appreciated that rod 230' is substantially identical to rod 230 except that the threaded end 239' is slightly longer than threaded end 239 of rod 230. The outer surface of gear nut 316 is adapted to mesh with a worm gear assembly 320 supported within housing 310 at right angles to the gear nut 316.

As can be seen in FIGS. 27 and 28, worm gear assembly 320 is rotatably supported in bore 328 in housing 310. Worm gear assembly 320 has a head portion 322 and an axial body portion 324 that has a worm gear 326 formed thereon. A portion of the body 324 extends beyond the bottom of the worm gear 326 to be received in a corresponding bore 330 that is coaxial with bore 328. In this embodiment, a compression spring 332 is provided between the bottom of bore 328 and the worm gear portion 326 to bias the worm gear assembly 320 in the direction represented by arrow "D" in FIG. 27. Compression spring 332 serves to create a "drag" force on the worm gear assembly 320 such that it resists accidental rotation during workholding operations. As can be seen in FIGS. 27 and 28, a retaining cap 340 is mounted to the housing 310 and serves to retain the worm gear assembly 320 within bore 328. In this embodiment, a hexagonal wrench-receiving socket 329 is provided in head portion 322 to enable the worm gear assembly 320 to be selectively manually rotated. A conventional end cap member 350 that has an access slot therein is preferably pressed into a corresponding bore 342 in the retaining cap 310 to prevent chips, dirt and other debris from infiltrating bore 328.

To adjust the gear nut 316 on the end of the rod 230', a hexagonal wrench is inserted through the access slot in the end cap 350 and into socket 329 and an axial force is applied in the "E" direction to enable the worm gear assembly 320 to be rotated to cause the gear nut 316 to be threaded onto or off of the rod end 239'. Thus, the worm gear assembly 320 replaces the set nut 270 of the previously described embodiment.

In this embodiment, I also prefer to utilize a pressure gauge assembly 360 for measuring the amount of clamping pressure generated by the workholding apparatus. However, the skilled artisan will appreciate that the above-described worm gear arrangement can be utilized without the pressure gauge assembly 360.

Figure 31:
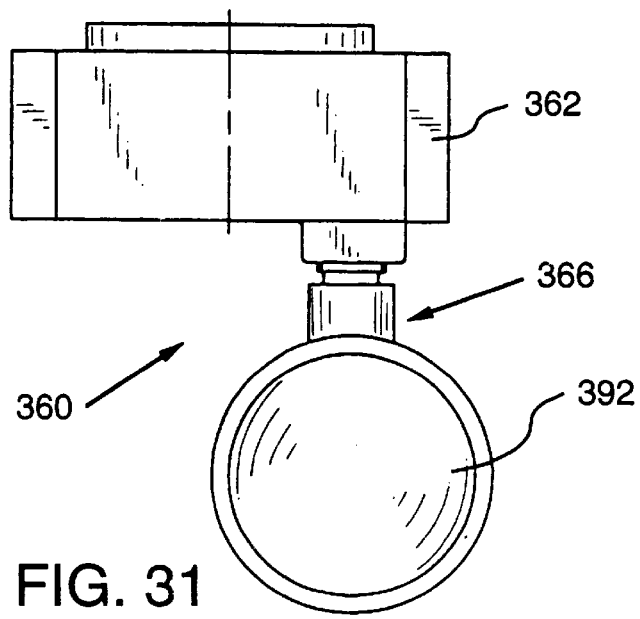
FIG. 31 shows a top view of the mounting block of FIG. 30 with a pressure gauge attached thereto.
Figure 32:
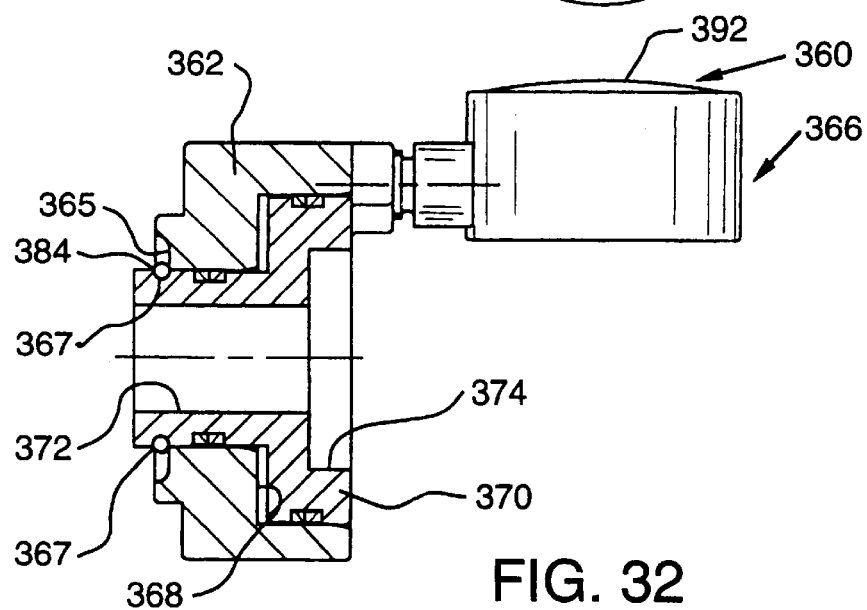
FIG. 32 is a partial cross-sectional view of a preferred pressure cell assembly of a preferred embodiment of FIGS. 26–31.

As can be seen in FIGS. 30–32, the pressure gauge assembly 360 comprises a pressure cell assembly 362 that is configured for attachment, to the second slide member for sliding travel within the longitudinal slot 112 in the base member 110. Preferably, pressure cell assembly 361 includes a mounting block 362 that is removably attached to the end of the second slide member 190 by three capscrews (not shown). Mounting block 362 is also provided with a threaded port 364 for threadably attaching a commercially available hydraulically operated pressure gauge 366.

Figure 33:
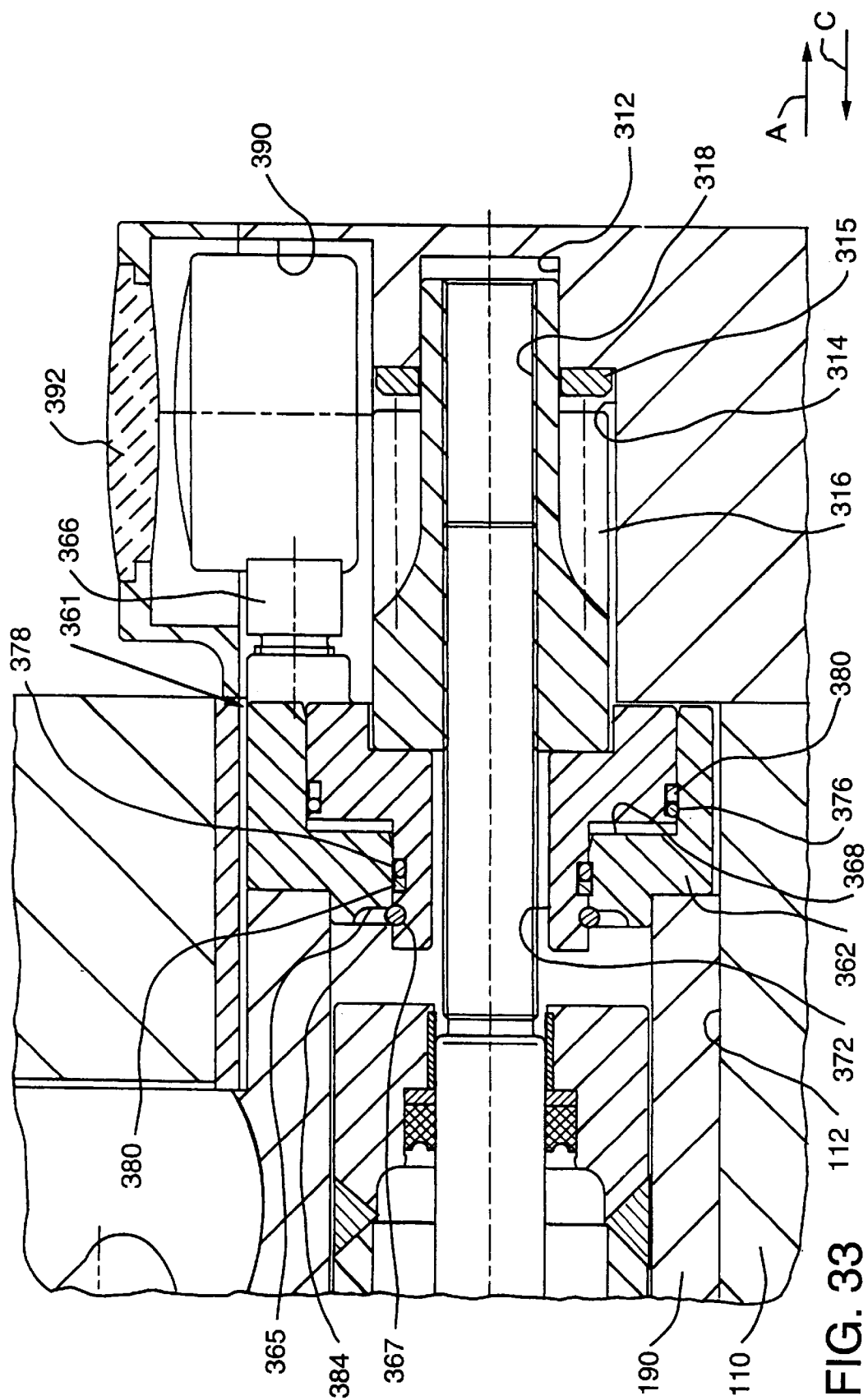
FIG. 33 shows a partial cross-sectional view of an end of the workholding apparatus depicted in FIG. 26.

The mounting block 362 is also provided with a counterbore 368 that is sized to slidably receive a pressure ring 370. As can be seen in FIGS. 32 and 33, pressure ring 370 has a first bore 372 that is adapted to permit the threaded end 239' of rod 230' to pass therethrough. Pressure ring 370 also preferably has a counterbore 374 that is coaxially aligned with bore 372 and sized to receive an end of the gear nut 316 therein. See FIG. 33.

As can be seen in FIG. 33, the pressure ring 370 is retained within the mounting block 362 by a retaining ring 384 that is fabricated from, for example, spring steel and is received within corresponding annular grooves (365, 367) in the mounting block 362 and the pressure ring 370, respectively. Pressure ring 370 is supported within the mounting block 362 such that a fluid receiving cavity 368 is created between the pressure ring 370 and the bottom of bore 368. A substantially fluid-tight seal is created between the pressure ring 370 and the mounting block 362 by O-rings (376, 378) and their corresponding backing rings (380, 382) as shown in FIG. 33. Because the operation of the hydraulically actuated pressure gauge 366 is known in the art, the specific operational details thereof will not be herein disclosed. However, the skilled artisan will appreciate that a hydraulic fluid is contained within the cavity 368 between the mounting block 362 and the pressure ring 370 such that when the pressure ring is axially moved relative to the mounting block to compress the fluid, the fluid causes the pressure gauge 366 to reflect the actual amount of compression force exerted on the fluid.

The operation of this embodiment will now be described. To initially set the clamping force, a sufficient amount of hydraulic pressure is applied from a source 260 to the hydraulic fluid-receiving portion 141 of the piston-receiving cavity 142 causing the first slide member 180 to move in the "A" direction causing the first jaw member 188 to contact the center jaw 160 and the second slide member 190 to contact the edge of 175 of opening 174 in the cover plate 170. Thereafter, the worm gear assembly 320 is rotated in the clockwise direction to cause the gear nut 316 to be threadably advanced on rod end 239' in the "C" direction until the gear nut 316 contacts the bottom of the counterbore 374 and the pressure ring 370. Thereafter, hydraulic pressure is increased to the hydraulic fluid-receiving portion 141 a sufficient amount to cause the gear nut 316 to move a predetermined distance in the "A" direction. The worm gear assembly 320 is then rotated in the clockwise direction to cause the gear nut 316 to be threadably advanced on the rod end 239' until it again contacts the bottom of counterbore 374 in the pressure ring 370. The hydraulic pressure to the hydraulic fluid-receiving portion 141 of the piston-receiving cavity 142 is increased further causing the end cap assembly 140 to move in the "C" direction permitting spring 202 to bias the first slide member 180 to its open position. Both of the jaw members (188, 200) are in the open positions. See FIG. 16.

After the jaw members (188, 200) have been moved to their open positions, a first workpiece can be placed between the first jaw member 188 and the center jaw member 160. Thereafter, the hydraulic pressure to the hydraulic fluid-receiving portion 141 is slowly reduced which permits the end cap assembly 140 to move in the "A" direction until the first workpiece is clamped between the first jaw member 188 and the center jaw member 160. After the first workpiece has been clamped, a second workpiece can be inserted between the second jaw member 200 and the center jaw member 160. Thereafter, the hydraulic pressure to the hydraulic fluid-receiving portion 141 is reduced to zero, thereby permitting the piston and rod assembly 201 to be biased in the "C" direction by the compressed silicone within the receiving space 124 and the spring tube 122. When in such position, the gear nut 316 will compress the fluid within the cavity 368 to thereby cause the pressure gauge 366 to indicate the amount of compressive force that is retaining both workpieces. The skilled artisan will of course appreciate that the compressive forces retaining the workpieces are equivalent and will be indicated by the pressure gauge 366. This particular embodiment is particularly advantageous for use in connection with clusters of such vise-like workholders wherein multiple clamping assemblies are supported within a single base member that can be arranged in a vertical orientation.

Figure 34:
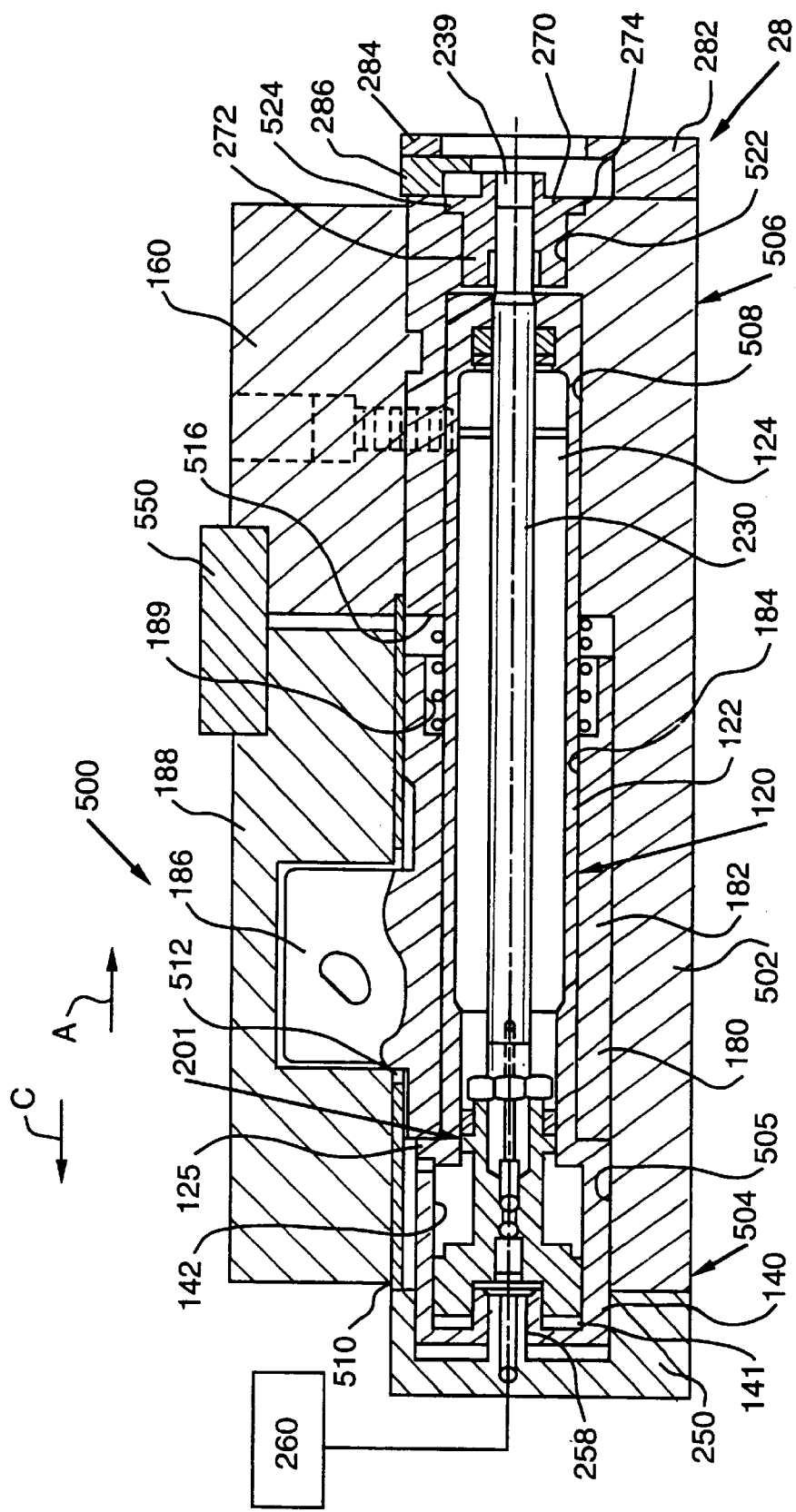
FIG. 34 shows a partial cross-sectional side elevational view of another vise-like workholder of the present invention.

FIG. 34 discloses still another preferred embodiment of the subject invention. The skilled artisan will appreciate that, with the exception of the differences discussed below, the embodiment depicted in FIG. 34 utilizes many of the same components as the embodiment depicted in FIGS. 7–25. This embodiment, however, only has one movable jaw.

As can be seen in FIG. 34, the workholder 500 includes a base member 502. In this embodiment, the base member 502 has a slotted end 504 a solid end 506. Slotted end 504 supports a clamping assembly 120 of the type and construction discussed herein above. The solid end 506 has a longitudinally extending bore 508 that is adapted to slidably receive a portion of a spring tube 122 therein. The workholder 500 also includes a fixed jaw 160 that is non-movably attached to the solid end 506 of the base member 502.

The slotted end 504 slidably supports a first slide member 180. More specifically, the first slide member 180 has a body portion 182 that has a longitudinal bore 184 therethrough that is sized to slidably receive the spring tube 122 therein. One end of the first slide member 180 is adapted to abut the threaded flange 125 of the spring tube 122 that forms the piston-receiving cavity 142. The first slide member 180 further includes a tower portion 186 that is preferably integrally formed with the body portion 182. The tower portion 186 extends out of the slot 505 in the base member 502 and through a corresponding slotted opening 512 in a cover plate 510 to support a first jaw member 188 thereon in the manner described above. It will be appreciated that opening 512 in the cover plate 510 is sized to permit the first slide member 180 to travel a predetermined axial distance within slot 112. The end of the slide member 180 that faces the solid end 506 of the base member 510 has a bore 189 therein for receiving a compression spring 516 that is supported on the spring tube 122 between the first slide member 180 and the solid end 506 of the base member 502.

In this embodiment, the end 239 of rod 230 that protrudes through bore 130 in the spring tube 122 is threaded and is adapted to threadably receive a threaded set nut 270. As can be seen in FIG. 34, the set nut 270 has a body portion 272 that is adapted to be received in bore 522 in the solid end 506 of the base member 502. The set nut 270 also has a flange 274 that is adapted to selectively engage the bottom of a counterbore 524 that is coaxially aligned with the bore 522 in the base member 502.

The axial and rotational motion of the set nut 270 is selectively controlled by an end stop assembly generally designated as 280 that operates in the manner described hereinabove. The operation of this embodiment will now be described. To begin the clamping process, the slide member 286 is removed from the cavity 284 in the locking plate 282 to permit the set nut 270 to turn freely on the rod 230. Thereafter, a small amount of hydraulic fluid (i.e., 0.5 milliliters) is pumped under pressure from source 260 into the hydraulic fluid receiving-portion 141 of the piston-receiving cavity 142 through axial passage 258 in the manifold cap 250. The admission of such pressurized fluid into the hydraulic fluid receiving-portion 141 causes the rod 230 and the entire spring tube assembly 122 to move in the direction of arrow "A". As the spring tube 122 moves in that direction, the threaded flange portion 125 of the spring tube assembly 122 contacts the first slide member 180 causing it to also move in the "A" direction until the first jaw member 188 contacts the fixed center jaw 160. Thereafter, the set nut 270 is threaded further onto the rod 230 until the flanged portion 274 contacts the bottom of counterbore 524.

To set the clamping force, additional hydraulic fluid is pumped into the hydraulic fluid receiving portion 141 of the piston-receiving cavity 142 forcing the piston and rod assembly 201 in the "A" direction. Enough hydraulic fluid is pumped into the portion 141 to cause the piston and rod assembly 201 to move in the "A" direction a predetermined distance (preferably approximately 2.5 mm). Thereafter, the set nut 270 is further threaded onto the rod 230 until it contacts the bottom of the counterbore 524. The end stop slide member 286 is then reinserted over the set nut 270 to prevent the set nut 270 from moving axially. The hydraulic pressure to the hydraulic fluid-receiving portion 141 of the piston-receiving cavity 142 is then increased causing the set nut 270 to move against the end stop slide member 286. As the hydraulic pressure builds within the hydraulic fluid-receiving portion 141, the end cap assembly 140 moves in the direction represented by arrow "C", thereby permitting the spring 516 to urge the first slide member 180 away from the fixed jaw 160 to an open position.

After jaw 188 has been moved to an open position, a first workpiece 550 is inserted between the first jaw 188 and the center jaw 160. To clamp the workpiece 550, the hydraulic pressure to the hydraulic fluid receiving portion 141 is reduced to zero which permits the end cap assembly 140 to move in the "A" direction to engage the body portion 182 of slide member 180 and force the first jaw member 188 towards jaw 160. Such movement of jaw member 188 results in workpiece 550 being clamped between the first jaw member 188 and the fixed jaw 160. To remove the workpiece 550, hydraulic fluid under pressure is again supplied from source 260 to the hydraulic fluid-receiving portion 141 of piston-receiving cavity 142 to cause the piston and rod assembly 201 to move in the "A" direction and the end cap assembly 140 to move in the "C" direction thereby permitting spring 516 to urge the first slide member 180 to its open position. Thus, the advantages provided by the liquid spring arrangement of the present invention can also be successfully achieved in single station arrangements of the type depicted in FIG. 34.

The skilled artisan will readily appreciate that the embodiments of the present invention described above provide a vast improvement over prior hydraulically actuated vise-like workholders that will permit workpieces to become unclamped if hydraulic pressure is lost or interrupted to the unit. Workpieces clamped by the present invention, however, will remain clamped under full clamping force when hydraulic pressure is discontinued or interrupted. The subject invention is well adapted for use in machining operations where it is critical for the workpiece(s) to be maintained under full clamping force when hydraulic pressure is intentionally or accidentally discontinued from the unit. As such, the present invention provides solutions to the aforementioned problems associated with prior hydraulically actuated workholding apparatuses. The disclosure of the application hereby also incorporates the disclosed content of the relevant priority documents in full, including for purposes of incorporating features of these documents into claims of the present application. It will be further understood, however, that various changes in the details, materials and arrangements of parts which have been herein described and illustrated in order to explain the nature of the invention may be made by those skilled in the art within the principal and scope of the invention as expressed in the appended claims.

What is claimed is:

1. A fluid-operated actuation device for selectively controlling the axial movement of an actuation member between a first position where the workpiece can be removed from a chuck operably attached to said actuation member and a second position wherein a workpiece is retained by the chuck, the actuation device comprising:

a housing member having a longitudinal axis and defining a substantially fluid-tight receiving space and a substantially fluid-tight cylinder portion for receiving a pressurized fluid therein;

a predetermined amount of volume-compressible fluid medium within said fluid-tight receiving space; and an actuation member slidably supported within said housing and having a connection means for attaching said actuation member to said chuck, said actuation member having a stepped piston portion having first and second diameters and being axially movable within said substantially fluid-tight receiving space, a portion of said actuation member being slidably received in said cylinder portion and being axially movable therein in response to the admission and withdrawal of a pressurized fluid in said cylinder portion such that when said pressurized fluid is admitted into said cylinder portion, said actuation member is axially moved to a primary position which enables said workpiece to be removed from said chuck and when said pressurized fluid is removed from said cylinder, said actuation member is moved to a secondary axial position which causes said workpiece to be retained by said chuck.

2. The actuation device of claim 1 wherein said pressurized fluid is hydraulic fluid.

3. The actuation device mechanism of claim 1 wherein said portion of said operating connection received in said cylinder portion comprises a flanged piston.

4. The actuation device of claim 1 wherein said receiving space is formed concentrically with said longitudinal axis of said housing member.

5. The actuation device of claim 1 further comprising means attached to said housing member for changing the volume of said receiving space.

6. A fluid actuated mechanism for selectively applying reciprocatable axial force to a device having means responsive to said axial force for retaining and releasing an object, said fluid actuated mechanism comprising:

a hollow receiving body attachable to said device, said receiving body having an open end and an enclosed end;

a ram member axially received in said receiving body and having a portion thereof protruding through said enclosed end for attachment to said means responsive to said axial force, said ram member further having a piston portion thereon, one side of said piston portion cooperating with said receiving body and said enclosed end of said receiving body to define a substantially fluid-tight receiving space therebetween, the other side of said piston cooperating with said receiving body and said device to define a cylinder portion within said receiving body for receiving a pressurized fluid therein; and a compressible fluid received within said fluid-tight receiving space such that when a predetermined amount of pressurized fluid is admitted to said cylinder portion, said piston is forced toward said enclosed end of said receiving body and when a predetermined amount of said pressurized fluid is removed from said cylinder portion, said compressible fluid in said receiving space biases said piston away from said enclosed end of said receiving body.

7. The fluid actuated mechanism of claim 6 wherein said piston is a stepped piston.

8. The fluid actuated mechanism of claim 6 wherein said ram member is hollow for communicating a second fluid medium from a source thereof to said means responsive to said axial force of said device.

9. The fluid actuated mechanism of claim 6 further comprising:

a fill opening in said receiving body for facilitating the entry of said predetermined amount of said compressible fluid into said receiving space; and a check valve received in said fill opening such that said compressible fluid may be admitted into said receiving space therethrough and retained therein by said check valve.

10. The fluid actuated mechanism of claim 6 wherein said piston is attached to a piston of a hydraulic cylinder.

* * * * *